US005682132A

United States Patent [19]

Hiroyoshi et al.

[11] Patent Number: 5,682,132

[45] Date of Patent: Oct. 28, 1997

[54] VIBRATING MODULE

[75] Inventors: Hidetoshi Hiroyoshi; Kazutoshi Otomo; Yoshibumi Nakamura; Reiko Kimura; Shinichi Hayashizaki; Yukio Saitoh; Mitsuyasu Osada; Masashi Yamada; Yoshietsu Ono; Osamu Takahashi, all of Chiba, Japan

[73] Assignee: Seiko Instruments Inc., Japan

[21] Appl. No.: 533,337

[22] Filed: Sep. 25, 1995

[30] Foreign Application Priority Data

| | | | |
|---|---|---|---|
| Sep. 28, 1994 | [JP] | Japan | 6-233873 |
| May 19, 1995 | [JP] | Japan | 7-121661 |
| Aug. 21, 1995 | [JP] | Japan | 7-212244 |
| Sep. 14, 1995 | [JP] | Japan | 7-237409 |

[51] Int. Cl.[6] .................. H04B 3/36

[52] U.S. Cl. .................. 340/407.1; 340/825.46; 310/29

[58] Field of Search .................. 340/407.1, 825.46; 310/29, 36

[56] References Cited

U.S. PATENT DOCUMENTS

| | | | |
|---|---|---|---|
| 5,023,504 | 6/1991 | Mooney et al. | 340/825.46 |
| 5,107,155 | 4/1992 | Yamaguchi | 340/407.1 |
| 5,107,540 | 4/1992 | Mooney et al. | 340/825.46 |
| 5,189,751 | 3/1993 | Giuliani et al. | 310/36 |
| 5,327,120 | 7/1994 | McKee et al. | 340/825.46 |
| 5,436,622 | 7/1995 | Gutman et al. | 340/825.46 |

*Primary Examiner*—Jeffery Hofsass
*Assistant Examiner*—Timothy Edwards, Jr.
*Attorney, Agent, or Firm*—Adams & Wilks

[57] ABSTRACT

A vibrating module for generating a mainly non-audible alert signal comprises a vibrating mass supported by at least one spring and having a weight and a magnet. A drive coil is supported by a coil frame for placing the vibrating mass in a continuous reciprocating motion close to a resonant frequency determined by the vibrating mass and the spring. An electrical signal supplying device supplies an electrical signal to the drive coil to vibrate the vibrating mass in a linear reciprocating motion. A vibration transmitting device transmits the vibration of the vibrating mass via the spring to an outer portion of the vibrating module to generate a mainly non-audible alert signal.

26 Claims, 16 Drawing Sheets

310

VIBRATING MODULE

FIELD OF THE INVENTION

The present invention relates to vibrating modules that generate an alerting signal utilizing vibration, rather than calling of an audible electronic buzzer, to a user of portable equipment such as pagers, watches, portable phones or signal receivers for the visually-impaired.

The portable equipments, for example pagers, use a system wherein in response to the calling signal from a caller, an alerting mechanism incorporated in the pager worn by a user produces an alarm sound, thereby letting the user know that the user is being called.

This alerting means using an alarm sound has a serious disadvantage that the alarm sound may be audible to those people who happen to be near the user or may annoy them.

To overcome this disadvantage, vibrating modules are being offered as mainly-non-audio alerting signal generator wherein vibration is generated instead of an alarm sound so that only the user can recognize the alerting signal.

FIG. 16 is a general view of a conventional vibrating module using a cylindrical motor. In the conventional example shown in FIG. 16, an unbalanced weight 120 is attached to a shaft 970 of a cylindrical motor 900, and vibration is generated by rotation of the motor.

FIG. 17 is a diagram showing a conventional vibrating module utilizing a flat motor. FIG. 17B is a vertical section view of a conventional vibrating module utilizing a flat motor, whereas FIG. 17A is a top plan of a rotor of a conventional vibrating module utilizing a flat motor.

As shown in FIG. 17, a flat motor 900 is provided wherein a thin armature coil 220 is located on one side and molded with resin into a fan shape weight 120 to constitute a rotor. The flat motor 900 uses a flat rare earth magnet 110 magnetized in the direction of thickness to constitute a stator. Current supply and current switching of the armature coil 220 of the rotor is performed by a commutator 960 and a brush 950. By locating armature coils 220 on one side the, center of gravity of the rotor is located in unbalance and the armature coils 220 are rotated around the shaft 970 to operate as eccentric weights.

Other example of vibrating modules not using a motor is a vibrating module in which a vibrating mass held by spring comprises a permanent magnet and an additional mass vibrates continuously (Tokkai Hei 2-71298, Tokuhyo Hei 5-500022). In any of conventional examples including the above, a ring-shaped magnet magnetized in radial direction having a pair of magnetic poles is not used.

As example of a vibrating module having a plurality of anisotropic magnet pieces arranged on the circumference, there is a vibrating module that vibrates a vibrating mass held by two springs continuously in a reciprocating motion (U.S. Pat. No. 5,326,120).

Conventional vibrating modules have the following disadvantages:

(1) A vibrating module using a cylindrical motor has a limitation that, if the diameter of the cylindrical motor is made smaller, the unbalanced weight has to be made smaller, with the result of vibration output too weak for an alerting device to be used in practice. Furthermore, a vibrating module using a cylindrical motor is difficult to be miniaturized to a size usable in a thin card-type portable equipment.

Also, since the shaft is rotated at high speed with the unbalanced weights attached thereto, too much load is applied to the bearing, thereby shortening its life. Moreover, the shaft may be deformed by a shock caused when dropped.

(2) A vibrating module using a flat motor can be made thin but is difficult to provide a vibration in the direction of thickness. In addition of a relatively short life due to brush motor used, durability is so low as to be deformed by a shock caused by drop. Another disadvantage is that such vibrating module has a complicated structure and therefore is difficult to be manufactured, and is associated with high manufacturing costs.

(3) In a conventional example of a vibrating module wherein a magnet is vibrated in a reciprocating motion by means of spring, a vibrating mass consisting of a permanent magnet and a weight, and current flowing in the drive coil, since the magnet is not magnetized in the radial direction, drive efficiency is low and the structure is complicated. Therefore, since the characteristics needed to be used in practice are not yet obtained, such vibrating module is not actually used in practice.

(4) In the conventional vibrating module disclosed in U.S. Pat. No. 5,327,120, a plurality of anisotropic magnets that are easy to manufacture are arranged on the circumference. Therefore the dispersion of each magnet and the dispersion of dimensions and positioning by assembly are multiplied, and force applied to the magnets by electromagnetic force generated with the drive coil becomes ununiform. Disadvantageously, when the magnet and the coil are approached to a smaller interval between them for obtaining an enough alerting output, the magnet and the drive coil come into contact to each other during the use of the vibrating module in many cases.

To avoid this, the gap between the magnet and the drive coil must be enlarged. If the gap is large, however, the drive efficiency decreases considerably for a magnetic circuit, and the vibrating mass cannot have the vibration amplitude large enough for providing the needed alerting output.

Also, repulsion and attraction force are generated between the magnets when they are located close to each other, making the assembling work difficult. Therefore the interval between the magnets cannot be made small, so the area of the part where there is no magnet confronting a drive coil becomes large, considerably decreasing the generation efficiency of the electromagnetic force.

Thus, the problems to be solved in providing a vibrating module useful in practice which have been derived from the above can be summarized as follows:

1. To obtain the needed vibration output.
2. To reduce the dispersion of quality.
3. To make a small, thin and light-in-weight body. Particularly, to make the diameter of ϕ 25 mm or less.
4. To provide a long life and a high reliability.
5. To provide a high shock resistance.
6. To provide a high drive efficiency (low voltage and low power consumption).
7. To provide a low manufacturing cost.

SUMMARY OF THE INVENTION

The present invention provides a vibrating module generating a mainly-non-audible alerting signal for portable equipment utilizing a vibrating mass supported by spring and comprising a permanent magnet and additional mass, wherein the permanent magnet has a ring shape and is magnetized in the radial direction, particularly with a radial anisotropy. Such vibrating mass is vibrated continuously in a linear vibrating motion in the resonant frequency of around 100 Hz by the current made flowing in a drive coil to generate an alerting signal, thereby structuring a vibrating module having a small and thin body, a long lifetime, a high reliability and a high shock resistance.

To solve the above problems, the vibrating module according to the present invention has a structure characterized in the following points:

(1) The vibrating module is structured with a vibrating mass held by spring/springs and a drive coil that generates electromagnetic force with an electric signal supplied from the drive circuit, wherein the vibrating mass is put into a continuous reciprocating motion close to a resonant frequency determined by the vibrating mass and the spring/springs and thereby transmitting the vibration of the vibrating mass to the outside, to construct a vibrating module generating an alerting signal using vibration instead of sound as main means. The friction part, such as a bearing or brush, has been eliminated by adopting this construction.

(2) For the magnet that is a structure element of the vibrating mass, a radial anisotropic ring magnet is used which has been magnetized to constitute a single pair of magnetic poles in the radial direction and which is manufactured using the manufacturing method of ring-shaped radial magnet of the invention of Japanese patent application Hei 5-52473 applied by the same applicant of the present invention, to provide a vibrating module having a structure wherein the magnet and the coil are located confronting each other with a uniform interval around the circumference.

(3) As a means for increasing the efficiency of the magnetic circuit of the vibrating module, the drive coil and the magnet are so arranged that the center of the height of the drive coil and the center of the height of the magnet substantially coincide with each other and the height of the drive coil Lc>the height of the magnet Lm> or Lc<Lm.

(4) In order to increase the vibration force of the vibrating module, the weight of the vibrating mass needs to be increased while the vibrating mass is being prevented from coming in contact with the spring during vibration. For the shape of the vibrating mass which maximizes the weight while not contacting the vibrating mass with the spring, either the section of the vibrating mass confronting the spring has a deflection curve described as:

[Formula 1]

$$Y=k\times\{3\times X/L-4\times(X/L)^3\}$$

where $0\leqq X\leqq(L/2)$ $$Y=k\times[3\times(L-X)/L-4\times\{(L-X)/L\}\}^3]$$

where $(L/2)<X\leqq L$ or the shape of the vibrating mass is so formed as not to contact the deflection curve of the spring given by Formula 1 except the joint part of the vibrating mass and the spring when the vibration amplitude of the vibrating mass reaches the largest designed amplitude.

(5) The diameter of the spring becomes small as the vibrating module is miniaturized, and this leads to the difficulty in ensuring the effective length for obtaining the optimum resonant frequency. To ensure the effective length, the spring is given a curvature. Due to this curvature, however, a torsional motion is generated in the spring by the vibration of the spring, with the result that an abnormal vibration tends to occur in the vibrating mass. For this reason, in order to provide a simple reciprocating motion, the springs with opposite torsion polarities are arranged over and under the vibrating mass confronting each other if there are a plurality of the springs, or spring members with opposite torsion polarities are combined and integrated into a spring and arranged at least either over or under the vibrating mass in the vibrating module so that the torsional motions are compensated by each other.

(6) In case that two springs are used, to make the vibrating module thin, the springs are given a three-dimensional shape so that the interval between the springs is smaller at the center part.

The present invention thus structured solves the disadvantages of the conventional vibrating module for the following reasons:

(1) Differently from the conventional vibrating modules using a motor shown in FIG. 16 and FIG. 17, the vibrating module according to the present invention has a structure wherein a vibrating mass is put in a continuous reciprocating motion close to the resonant frequency by means of a radial magnet, a drive coil and spring/springs. Therefore the friction parts such as bearing and brush are eliminated, a small, thin body and light weight as well as a long life and a high reliability are achieved, and the shock resistance (drop resistance) is improved.

(2) By using a radial anisotropic ring magnet magnetized to constitute a single pair of magnetic poles in the radial direction, as the magnet confronts the drive coil around the circumference, the confronting area of the drive coil is larger than the conventional vibrating modules, significantly increasing the generation efficiency of electromagnetic force. As a result, a vibration output sufficient for a vibrating module is obtained while achieving a thinner body and a lower power consumption.

Also, the number of the parts is reduced by use of a single magnet, thereby diminishing the parts cost and the manufacturing cost. Moreover, in comparison with the conventional vibrating modules using a plurality of magnets which are difficult to assemble because the magnets generate the repulsion and attraction force between them when coming close to each other, in the vibrating module of the present invention, this problem in assembly is removed, improving the workability with the result of possible reduction of manufacturing cost.

Furthermore, in the conventional vibrating modules, the dispersion of property of each magnet and the dispersion of dimensions and positioning produced by assembly are multiplied, force applied to the magnets by electromagnetic force with the drive coil becomes nonuniform, thereby causing problems in quality. This problem is also solved in the present invention.

(3) The drive coil and the magnet are so arranged that the center of the height of the drive coil and the center of the height of the magnet substantially coincide with each other and the height of the drive coil Lc>the height of the magnet Lm> or Lc<Lm. As will be described in detail for the embodiments, in the conventional vibrating modules the drive force of the drive coil reduces when the magnet is displaced and the end surface of the magnet protrudes from the end surface of the drive coil. In the present invention, by adopting the structure where the drive coil and the magnet are arranged as described above, the efficiency of the magnetic circuit of the vibrating module is increased, the above described reduction in drive force is amended, and a low power consumption is achieved while providing a sufficient vibration output.

(4) In order to increase the vibration force of the vibrating module, as a shape of the vibrating mass which maximizes the weight while not contacting the vibrating mass with the spring, either the surface of the vibrating mass confronting the spring has a deflection curve described as:

[Formula 1]

$$Y=k\times\{3\times X/L-4\times(X/L)^3\}$$

where $0\leqq X\leqq(L/2)$ $$Y=k\times[3\times(L-X)/L-4\times\{(L-X)/L\}^3]$$

where $(L/2)<X\leqq L$ or the shape of the vibrating mass is so formed as not to contact the deflection curve of the spring given by Formula 1 except the joint part of the vibrating mass and the spring when the vibration amplitude of the vibrating mass reaches the largest designed amplitude. By adopting such shape, the weight of the vibrating mass can be increased while the vibrating mass is being prevented from contacting the spring during the operation of the vibrating module, allowing to provide a sufficient vibration output while achieving a thinner body.

(5) The springs with opposite torsion polarities are arranged over and under the vibrating mass confronting each other or spring members with opposite torsion polarities are combined and integrated into a spring and arranged over or under the vibrating mass in the vibrating module so that the torsional motions are compensated by each other. Thus, the vibrating mass effectuates a stable reciprocating motion only without generating a torsional motion.

(6) In case that two springs are used, to make the vibrating module thin, the springs are given a three-dimensional shape to have a smaller interval at the center part between the springs, thus allowing a thin vibrating module body.

DETAILED DESCRIPTION OF THE INVENTION

Figure 1:
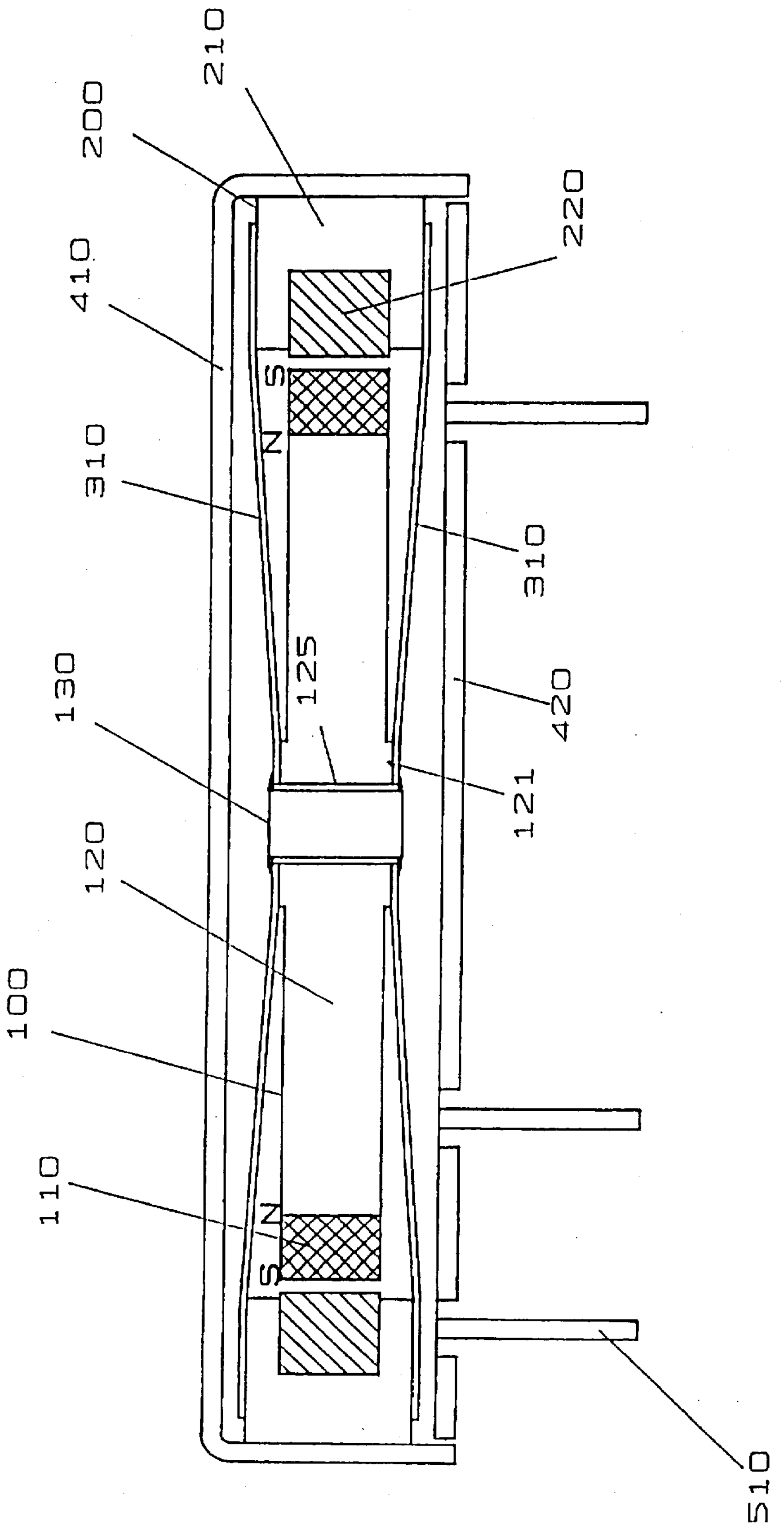
FIG. 1 is a section view showing the structure of a vibrating module of an embodiment of the present invention.

The embodiments of the present invention will be hereinafter described referring to the drawings. In the drawings of the embodiments, the same numeral is given to the identical part, and the same description will not be repeated for each drawing.

[Embodiment 1]

Figure 2:
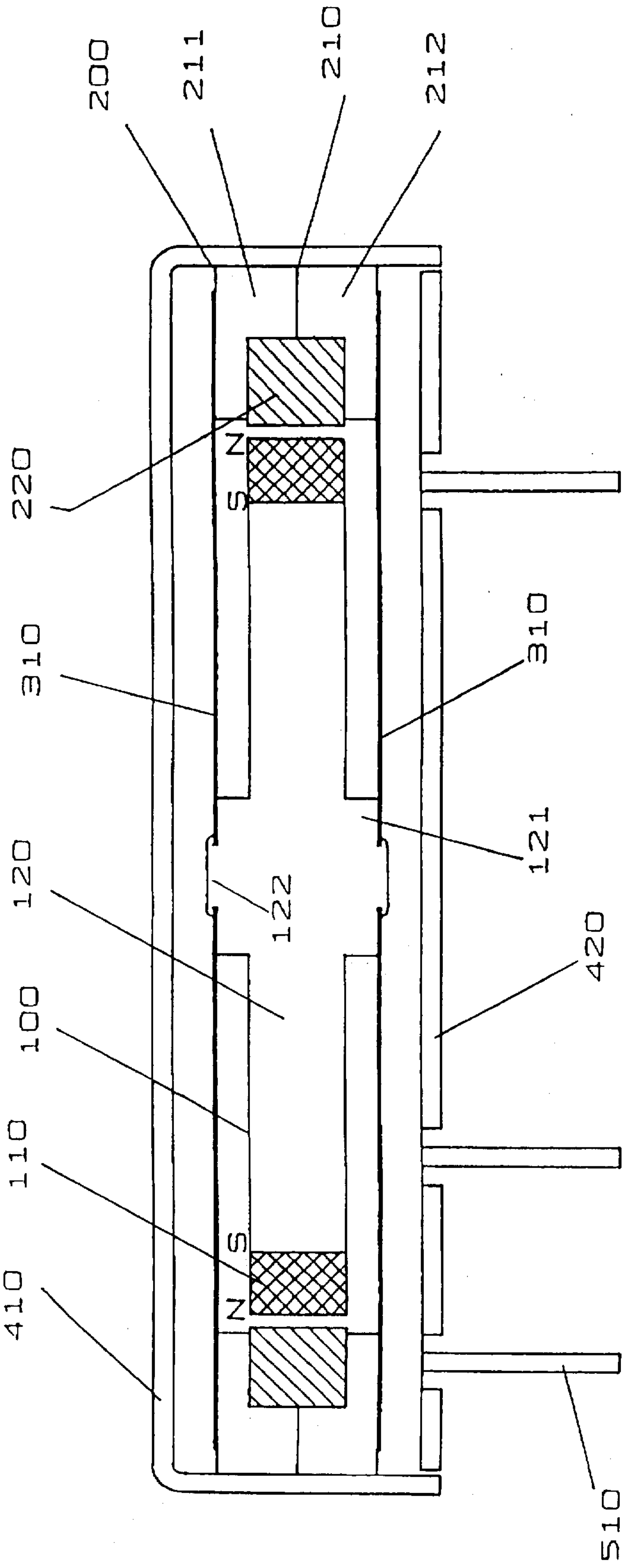
FIG. 2 is a section view showing the structure of a vibrating module of another embodiment of the present invention.

The outer appearance of the vibrating module of embodiment 1 is substantially of a disc shape. FIG. 1 and FIG. 2 are longitudinal section views taken at the center of the vibrating module according to embodiments of the present invention. The difference of the embodiments of FIG. 1 and FIG. 2 is the three-dimensional shape of the springs 310.

Referring to FIG. 1 and FIG. 2, springs 310 are joined with a vibrating mass 100 by means such as caulking and are fixedly secured to a drive coil block 200 by means such as welding. The drive coil block 200 consists of a drive coil 220 and a drive coil frame 210 made of resin holding the drive coil.

A magnet 110 magnetized in the radial direction which is a constituent of the vibrating mass 100 and the drive coil 220 of the drive coil block 200 has a slight gap between them, confronting each other in the direction of radius. Drive current supplied to the drive coil 220 through a terminal 510 and the magnet generate an electromagnetic force in the longitudinal direction, and the vibrating mass vibrates in the longitudinal direction of the vibrating module close to a resonant frequency determined by the weight of the vibrating mass 100 and the springs 310.

A case 410 and a case 420 contain the above mentioned drive coil block with the springs and the vibrating mass attached thereto. The terminal 510 is provided in the drive coil block 200 and connected to the end of the drive coil 220 to supply drive current to the drive coil from the outside.

The vibrating mass 100 consists of a single ring magnet 110 magnetized in the radial direction attached to a weight 120 using adhesive and the like.

To have an outer diameter of the vibrator of ϕ 25 mm or less so as to be mounted in small-size portable equipment, the magnetic circuit including the magnet must also be miniaturized. Generally the magnetic circuit loses the drive force if miniaturized, yet the needed magnetomotive force must be ensured to provide the needed vibration output even with miniaturized magnet.

Therefore, the above mentioned magnet 110 require a large energy density using magnets such as centered SmCo and Nd Fe B magnets or bonded magnets consisting of rare earth magnet materials.

The rare earth centered magnet has problems that it is easy to chip in the surface corner, easy to generate magnet powder, and it rusts, and is therefore preferably used with a surface coating such as plating, painting. Appropriate chamfering on the ring edge of the magnet is also preferable to avoid chipping on the edge of the magnet as well as to facilitate insertion into the weight 120.

The magnet 110 is molded in a magnetic field to be oriented radially during molding, then is surface coated if necessary, and radially magnetized.

To make the outer diameter of the vibrating module $\phi$ 25 mm or less, the outer diameter of the ring magnet to be used for the vibrating mass is preferably $\phi$ 20 mm or less.

Thus a ring-shaped radial anisotropic, radially magnetized magnet of a small outer diameter of $\Phi$ 20 mm or less which is integrally molded is manufactured. For the method of orientation for such small-diameter radial magnet, a method of orientation of the Japanese patent application (Tokugan Hei 5-52473) of the same applicant is effective, and this method has allowed the industrial manufacturing of a small-diameter magnet having an outer diameter of $\Phi$ 20 mm or less which is used for the present invention.

The magnet 110 is so magnetized that a single pair of magnetic poles is obtained as shown in FIG. 1 and FIG. 2.

The vibration frequency of the vibrating module is determined by the weight of the spring 310 and the vibrating mass 100. The weight 120 supports the magnet 110 and has a purpose to adjust the weight of the vibrating mass. In order to constitute a small and thin vibrating module, material of the weight 120 needs to be a metal with a large specific gravity such as tungsten alloy or lead alloy to ensure the needed weight even with a reduced volume of the weight 120. The resonant frequency of the vibrating module of the present invention is adjusted to approximately 80 Hz to 150 Hz by means of the above described spring 310 and the vibrating mass 100.

The above mentioned tungsten alloy may have a specific gravity of around 19, but is adjusted to have a specific gravity of 10 or more considering the economy because the price of tungsten is expensive. Tungsten alloy is manufactured by centering alloy consisting of either W, Ni and Cu or W, Ni and Fe.

By the method of manufacturing the weight by centering, however, there is difficulty in providing accuracy in size due to contraction during centering. Therefore a finish process is conducted by sizing to ensure the accuracy of dimensions. Tungsten content is determined to be 40 to 97 wt. % considering the economy and workability in order to have a specific gravity of 10 or more.

For the shape of the weight, the joint part 121 with the springs 310 has sightly larger height than main part of weight 120 as shown in FIG. 1 and FIG. 2, to allow optimum setting of the contact area with the springs.

Figure 3:
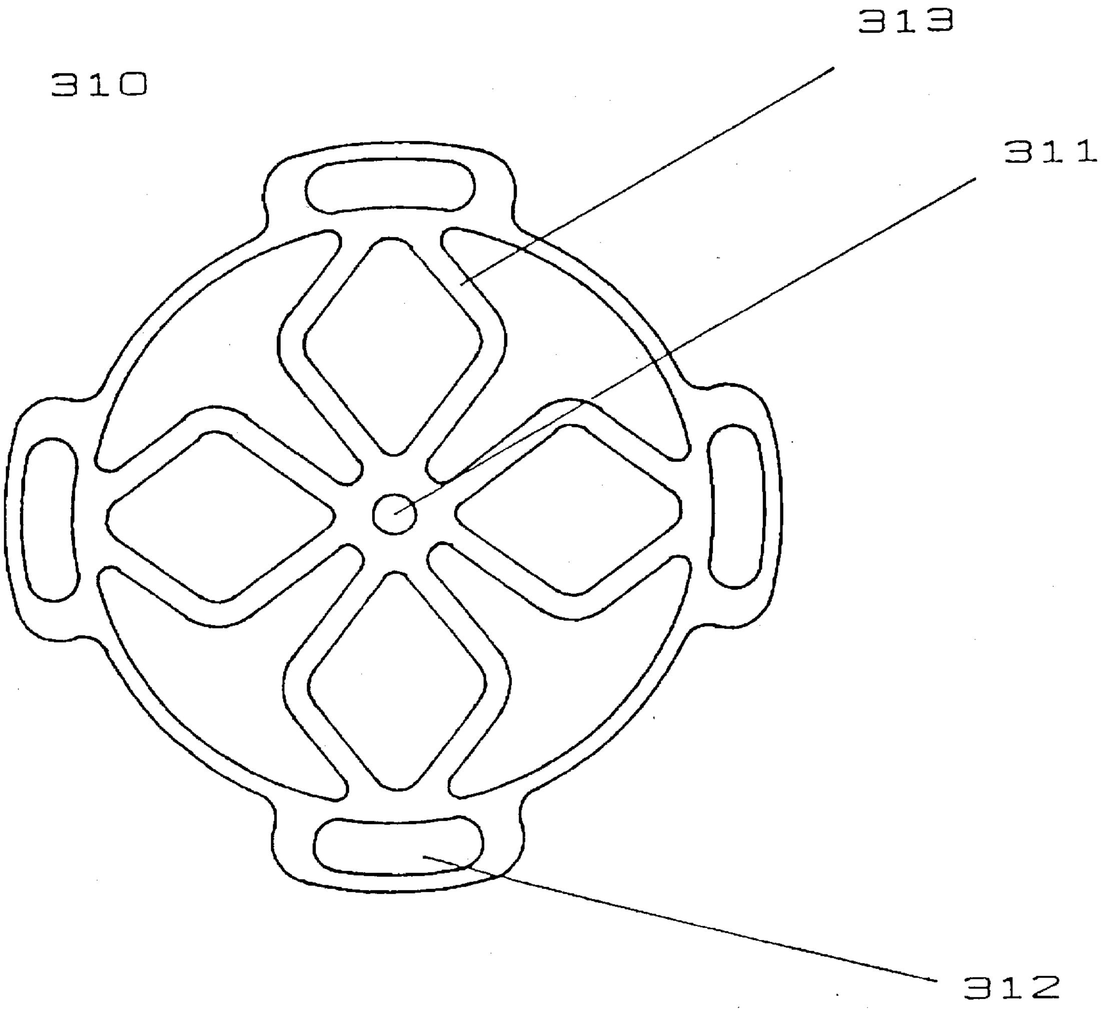
FIG. 3 is a plan view showing an embodiment of the structure of the spring of the vibrating module of the present invention.

For the joint of the vibrating mass 100 and the springs 310, in the case of FIG. 1, the two springs are placed with the weight therebetween, and a pin 130 is inserted in the hole 125 provided through the center of the weight, then the pin 130 is put through a center hole 311 of the spring 310 shown in FIG. 3, and the tip of the pin is deformed by means such as caulking.

In the case of FIG. 2, a protruding portion 122 is provided on the weight 120, and the protruding portion 122 of the weight 120 is put through the center hole 311 of the spring 310 shown in FIG. 3, and then the tip of the protruding portion is deformed by means such as caulking to join the vibrating mass and the spring. As means for joining the weight and the spring, other than the above mentioned caulking, a method of driving a caulking pin, a method of driving a washer, and a method of using adhesive and the like are also available.

The frequency determined by the spring and the vibrating mass can be designed using a model of a beam fixed at both ends with a load added to the center and support at both ends. If the vibrating mass is lighter in weight, the springs becomes relatively thinner, causing problem in strength. The shape of the spring must be determined considering lifetime.

FIG. 3 is a plan view of the spring 310 of the present invention. The center hole 311 of the spring 310 is for fixing the spring to the vibrating mass as described above, and the fixing hole 312 is for fixing the spring to the drive coil frame. The beam portion 313 is the beam of the above described model for calculation, and this abortion performs the essential function of the spring.

The plan view of the spring mounted in the vibrating module is substantially the same for the embodiment of the present invention shown in FIG. 1 and for another embodiment of the present invention shown in FIG. 2. The difference between them is in the three-dimensional shape of the spring 310. Specifically, in the embodiment of the present invention shown in the longitudinal section view of FIG. 1, the interval between the upper and the lower springs 310 varies at the center and circumference with regard to the direction of radius, that is, the springs has a three-dimensional shape so that the interval is smaller at the center part of the springs 310. This shape allows to minimize the gap between the spring and the case close to zero, achieving the miniaturization of the vibrating module.

In another embodiment of the present invention shown in FIG. 2, the spring 310 is in one plane, the interval between the upper and the lower spring is substantially the same at the center and circumference of the spring 310.

As the vibration force of the vibrating module is proportional to the weight and amplitude of the vibrating mass and to the square of the resonant frequency, the needed designed amplitude must be ensured to provide a vibration force needed for the vibrating module. In the embodiment of FIG. 2, the intervals between the vibrating mass 100 and the spring 310, between the springs 310 and the case 410 and the case 420 must be larger than the designed amplitude of the vibration. The intervals therefore have to be set large, resulting in a large thickness of the vibrating module.

In the embodiment of FIG. 1, the spring 310 has a three-dimensional shape so that the interval at the center is smaller than the interval at the circumference, allowing to reduce the interval between the spring and the case and thereby to make a thinner-body of the vibrating module. Particularly if the interval at the center part is so narrowed that the difference between the height of the joint part of the spring and the vibrating mass and the height of the joint part of the spring and the drive coil block is larger than the designed amplitude of the vibrating module, the intervals between the case 410 and the upper spring 310 and between the case 420 and the lower spring 310 at the circumference can be zero theoretically. Thus a thinner body for the vibrating module is allowed in the embodiment of FIG. 1.

The drive coil block 200 consists of a drive coil 220 and a drive coil frame 210 made of resin holding the drive coil, as described earlier. In FIG. 1 the drive coil 220 and the terminal 510 are integrally formed with the drive coil frame 210, whereas in FIG. 2 the drive coil 220 is located between two drive coil frames 211 and 212 and attached thereto by means of mechanical fitting or adhesives, and the attached two drive coil frames are integrated into one unit to constitute a drive coil frame 210.

In the coil frame 212 there is further provided a terminal 510 which is electrically connected to the drive coil 220. By a drive current from the outside, magnetic flux is generated in the drive coil 220.

A terminal is used as current supply path to the drive coil in FIG. 1 and FIG. 2, but other means such as lead wire and flexible substrate may be used.

Three terminals are provided in the embodiments of FIG. 1 and FIG. 2, but one of these terminal is for fixing the vibrating module to the substrate and therefore is not necessary for electrical purpose.

Two springs 310 are joined to the drive coil block 200. For the method of joining, protruding parts are provided on the drive coil frame 210 corresponding to the fixing holes 312 of the spring. The protruding parts are put into the fixing holes 312 and heat welded or ultrasonic welded to fix the spring with the drive coil frame. For the method of fixing, other than the method above, a method whereby the drive coil frame 210 is formed with the spring 310 is inserted therein to integrate the spring with the drive coil frame and other methods such as using adhesive or mechanical fixing can be used.

The vibrating module that vibrates in a linear reciprocating motion which is the purpose of the present invention is essentially constituted by the above described drive coil block 200 with the terminals 510, the vibrating mass 100 and the springs 310 only. The gap between the magnet 220 and the drive coil 110 is set to the minimum to increase electromagnetic efficiency. Consequently vibration is restricted or stopped if unexpected particles such as dust intrude or the spring comes into contact with an external object. To prevent this the cases 410 and 420 are provided.

As the vibrating module of the present invention is intended for the use in thin portable equipment, the gap between the cases 410 and 420 and the magnet 110 is naturally small. Consequently if the cases 410 and 420 is made of magnetic substance, a magnetic attracting force is effected between the magnet and the cases and restricts the vibration of the vibrating mass. Therefore the cases 410 and 420 must be made of non-magnetic material.

For the material of the case, for examples of metal, non-magnetic SUS materials (such as SUS 304 and SUS 316), aluminum and the like are suitable. Plastic case may also be used.

Mechanical fixing such as caulking and crimping is advantageous for a metal case, but adhering is also available. For a plastic case, mechanical fixing such as welding as well as the use of adhesives are available.

[Embodiment 2]

Another embodiment of the present invention will now be described referring to the drawing.

Figure 4:
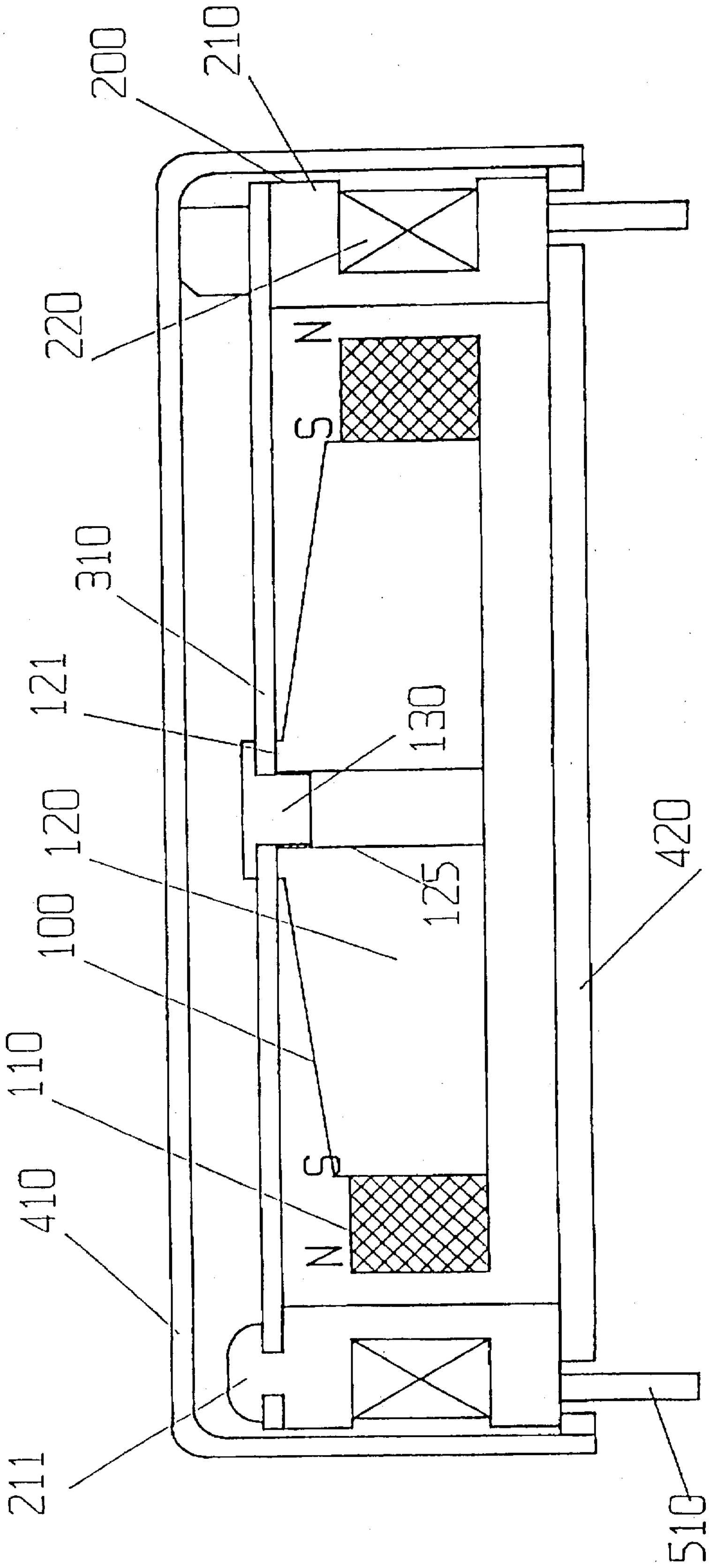
FIG. 4 is a section view showing the structure of a vibrating module of another embodiment of the present invention.

Referring to FIG. 4, a single spring 310 is joined with a vibrating mass 100 by means such as driving a caulking pin 130 and fixedly secured to a drive coil block 200 by means such as welding. A drive coil block 200 is structured by winding a drive coil 220 around a bobbin 210 made of resin. The vibrating mass 100 is arranged around inner circumference of the drive coil block 200.

The magnet 110 magnetized radially which is a constituent of the vibrating mass 100 and the drive coil 220 of the drive coil block 200 confront each other in the radial direction with a small gap between them. Electromagnetic force in the longitudinal direction is generated by the drive current supplied through a terminal 510 to the drive coil 220 and the magnet, vibrating the vibrating mass in the longitudinal direction of the vibrating module around the resonant frequency of 80 Hz to 150 Hz determined by the weight of the vibrating mass 100 and the spring 310.

A case 410 and a case 420 contain the drive coil block 200, the spring and the vibrating mass. The terminal 510 is provided on the drive coil block 200, being connected to the end of the drive coil 220 to supply drive current to the drive coil from the outside.

The vibrating mass 100 uses a ring magnet 110 oriented in a single radial direction and radially magnetized as described in detail for embodiment 1, which is fixed to a weight 120 using adhesive and the like.

As is described in detail for embodiment 1, the resonant frequency of the vibrating module is determined by the weight of the spring 310 and the vibrating mass 100. Also, as described earlier, since the vibration force of the vibrating module is proportional to the weight, amplitude of the vibrating mass and the square of the resonant frequency, to ensure the needed weight despite a small volume for constituting a small and thin body vibrating module, the weight 120 must use a metal material with a large specific gravity and have a largest possible volume allowed in the given space.

As a metal material with a large specific gravity, tungsten alloy which is described in detail for embodiment 1 is used. Now we will describe the embodiment of the present invention which is designed to maximize the volume of the vibrating mass in the space allowed while not letting the vibrating mass 100 come into contact with the spring 310, as the weight contacting the spring 310 would stop the vibration or cause an abnormal vibration having a radically changing resonant frequency.

Figure 5:
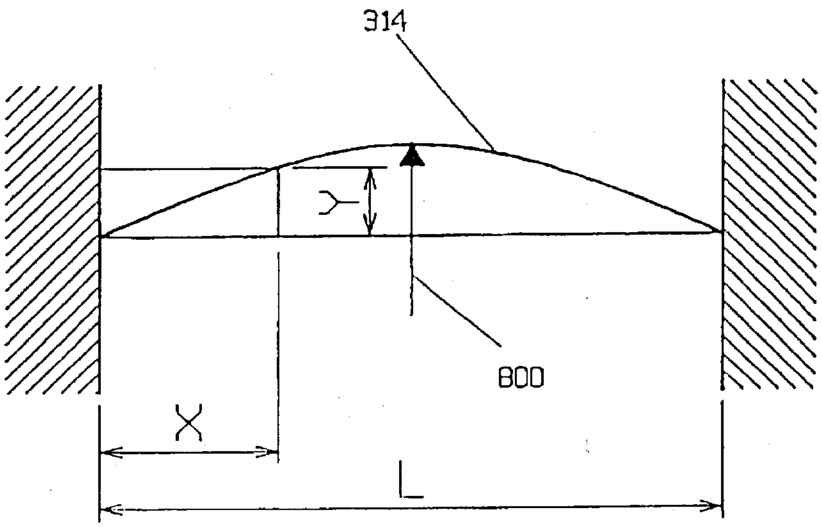
FIG. 5 is a schematic diagram explaining the calculation method of the deflection curve of the spring used in the vibrating module of the present invention.

The frequency determined by the spring and the vibrating mass, which has been described in detail for embodiment 1, can be designed using a model of a beam fixed at both ends with a load added to the center or a model of a beam supported at both ends with a load added to the center of the beam. FIG. 5 is a diagram of a model of the spring of the present invention made as a beam fixed at both ends with a concentrated load 800 at the center thereof. Referring to FIG. 5, L indicates the overall length of the beam, and X indicates the length from one fixed end to the calculation point k is a constant determined by the load, the material and shape of the spring.

The static deflection curve 314 of the model of the spring 310 made as a beam fixed at both ends with a concentrated load at the center is defined by Formula 1:

[Formula 1]

$$Y=k\times\{3\times X/L-4\times(X/L)^3\}$$

where $0 \leqq X \leqq (L/2),\ k>0$ $$Y=k\times[3\times(L-X)/L-4\times\{(L-X)/L\}^3]$$

where $(L/2) < X \leqq L,\ k>0$

Figure 6:
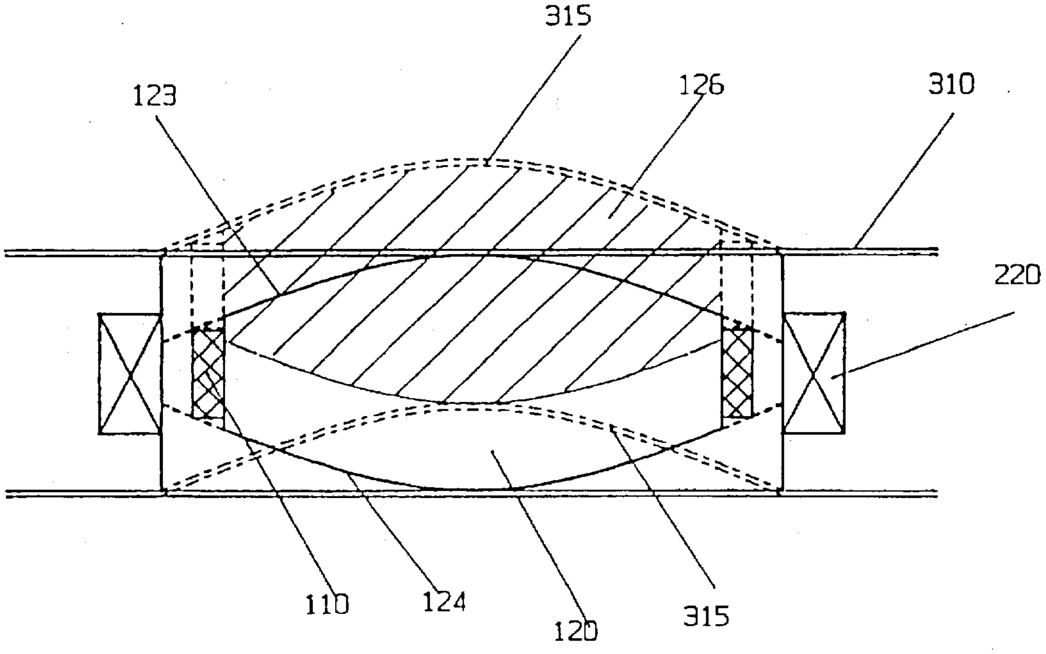
FIG. 6 is a schematic diagram explaining the operation of the spring and the weight used in the vibrating module of the present invention.

FIG. 6 is a section diagram showing the relationship between the weight and the spring of another embodiment of the present invention. The curve 123 representing the upper external shape of the section of the weight 120 in a static state is so formed as to coincide with the curve of Formula 1. The radially-magnetized magnet 110 of the present invention is arranged on the under side the weight 120 side of the curve of Formula 1, and is attached thereto without going beyond the curve of Formula 1 to constitute the vibrating mass 100.

More specifically, the surface shape of the vibrating mass 100 is so formed that no portion of the vibrating mass 100 except the joint part thereof contacts the deflection curve given by Formula 1 which corresponds to the maximum amplitude designed for the spring 310 with the vibrating mass 100.

Also, another curve 124 representing the lower external shape of the section of the weight 120 in a static state is so formed as to coincides with a portion of the curve defined by substituting −Y for Y in Formula 1. The lower surface of the magnet 110 is so formed as not to go beyond the curve defined by substituting −Y for Y in Formula 1.

The weight 120 in a static state is joined at its vertex to the spring 310 being in static state. When a drive current is supplied to the drive coil 220 and the vibrating mass 100 is displaced to the maximum designed amplitude, in the upper direction in FIG. 6, for example, due to vibration caused by an electromagnetic force between the drive coil and the above described magnet, the weight 120 is displaced upward in FIG. 6. Referring to FIG. 6, the displaced weight is indicated by 126. If the spring displaced to the maximum designed amplitude is indicated by 315, the curve 123 representing the upper external shape of the section of the weight 120 in static state, after being displaced to the maximum designed amplitude, comes close to the spring 315.

Therefore by so forming the section shape of the weight as not to go beyond the curve defined by Formula 1, the volume of the weight can be made maximum inside the space allowed. Preferably the section shape of the vibrating mass 100 consisting of the weight and the magnet approximates the shape of the curve defined by Formula 1 where Y=Y or Y=−Y while not allowing the vibrating mass except the joint part to come into contact with the spring when it is vibrating.

FIG. 7 shows practical examples of the weight of the present invention. Referring to FIG. 7A, for the use with two springs as shown in embodiment 1 of the present invention, the section shape of the weight 120 is inside the shape of the deflection curve of the spring 310 defined by Formula 1 and has a portion slightly higher at the fixing part 121 with the spring 310, thereby preventing the vibrating mass 100 and the springs from coming into contact with each other and allowing an optimum contact area of the fixing part with the weight 120 and the spring 310.

Figure 7A:
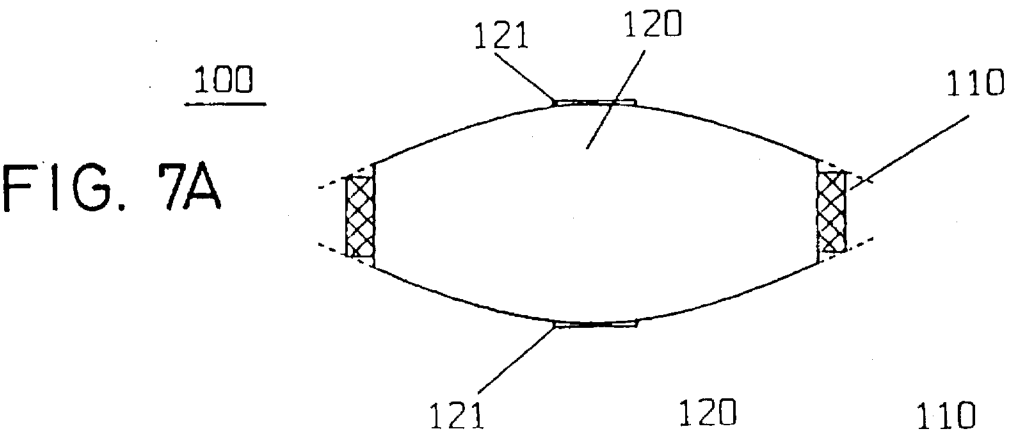
FIGS. 7A–7D are section view showing embodiments of the structure of the vibrating mass used in the vibrating module of the present invention.
Figure 7B:
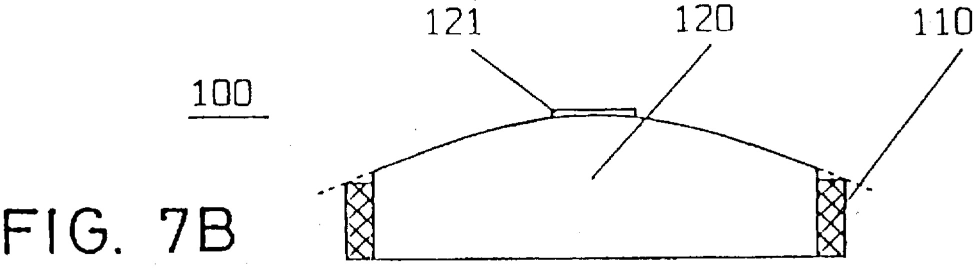

FIG. 7B is an example of the vibrating mass for the use with one spring as shown in embodiment 2 of the present invention, wherein the section shape of the weight 120 is inside (lowerside) the deflection curve of the spring 310 defined by Formula 1 and has a portion slightly higher at the fixing part 121 with the spring 310.

Figure 7C:
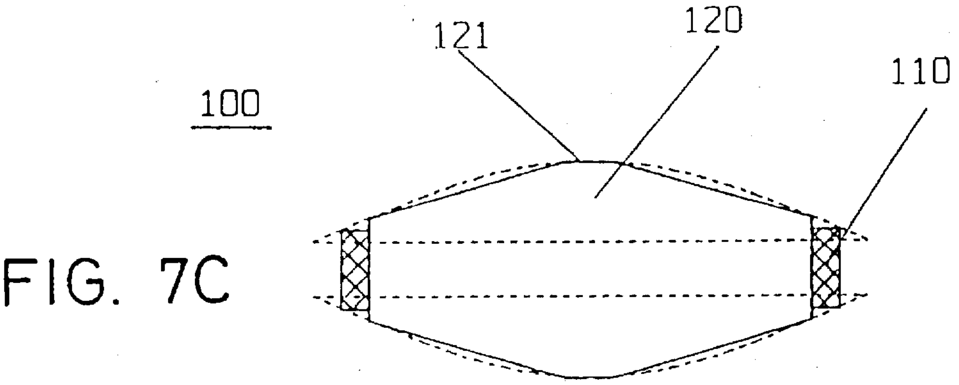

FIG. 7C is an example of the vibrating mass for the use with two springs as shown in embodiment 1 of the present invention, wherein to provide a shape industrially easy to be effectuated, the section shape of the weight 120 is constituted by straight lines which do not go beyond the deflection curve defined by Formula 1 to make a cone-shaped weight. To optimize the area of the mating part 121 with the weight 120 and the spring, the weight has a flat portion.

Figure 7D:
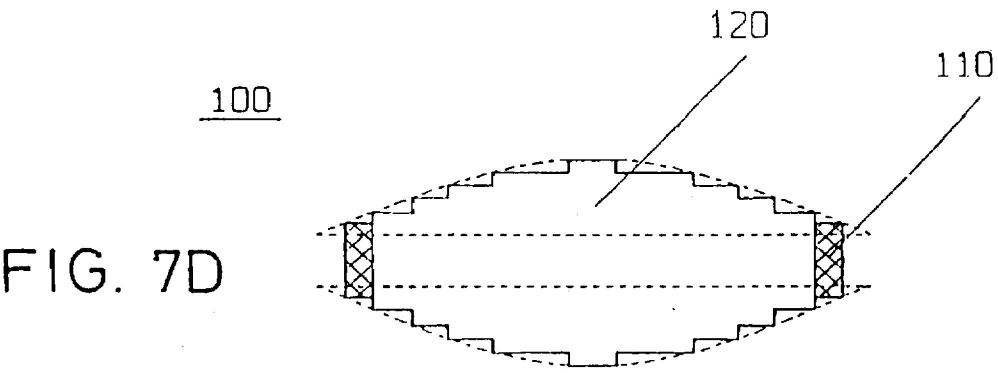

FIG. 7D is an example of the vibrating mass for the use with two springs as shown in embodiment 1 of the present invention, wherein to provide a shape easy to be industrially effectuated, the section shape of the weight 120 has a stepped shape with an envelop not exceeding the deflection curve of Formula 1, which is a shape similar to a plurality of disks stacked up.

Although not shown in the drawings, one side of the vibrating mass 100 consisting of the weight 120 shown in FIG. 7C and FIG. 7D and a magnet 110 can also be used with one spring as shown in embodiment 2 of the present invention. In that case, the other side of the vibrating mass may be designed freely.

In embodiment 2, the upper shape of the weight is a cone shown in the FIG. 7C of the present invention, the fixing part 121 with the spring 310 being slightly higher, while the lower shape of the weight is flat. Thus shaped weight 120 and the magnet 110 are attached to constitute a vibrating mass 100, which is fixed with the spring 310 by driving a caulking pin 130 through the hole 125 provided at the center of the weight.

For the fixing method, in the same way as embodiment 1, methods such as adhesive or caulking by use of pin are also available other than driving of a caulking pin.

Figure 8:
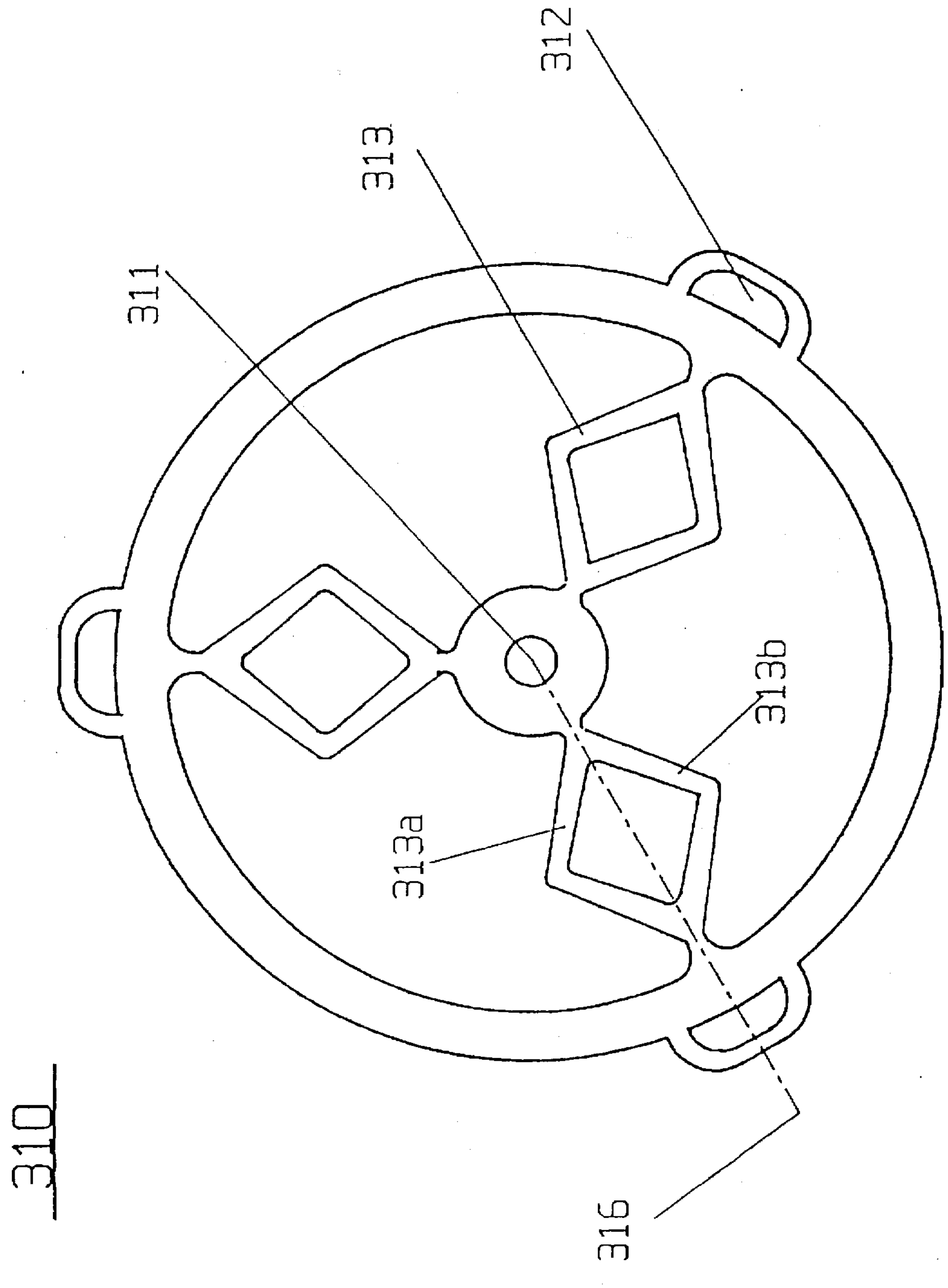
FIG. 8 is a plan view showing an embodiment of the structure of the spring used in the vibrating module of the present invention.

FIG. 8 is a plan view of the spring 310 of the present invention. As described earlier, the hole at the center of the spring 310 is provided for fixing the spring with the vibrating mass, whereas the fixing holes 312 are provided for fixing the spring with the bobbin. The beam portion 313 is that portion which performs the function of the spring itself.

Figure 10:
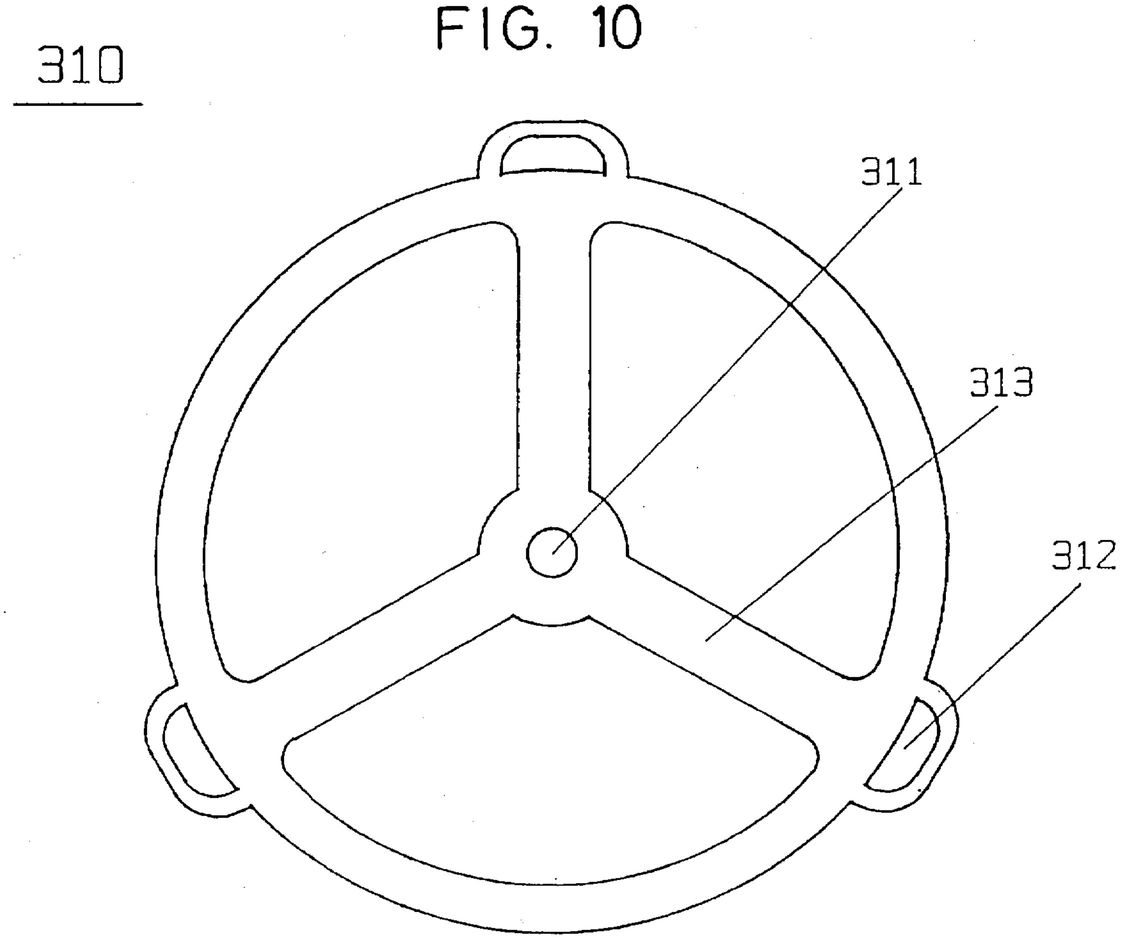
FIG. 10 is a plan view showing an embodiment of the structure of the spring used in the vibrating module of the present invention.

FIG. 10 is a diagram showing the basic structure of the spring of the present invention. While the beam portions 313 of the spring is structured in a linear shape in FIG. 10, in a vibrating module with a small-diameter of Φ 25 mm or less of the present invention, this structure cannot provide the needed effective length of the beam portions of the spring. In order to adjust to the designed frequency, either the width of the beam portions have to be made smaller or the spring has to be made thinner, yet this causes the problem of strength. Therefore in the present invention as a means for providing a long effective length for the beam portion 313 of the spring, the beam portion has an angle with regard to the center direction or a curvature.

Figure 9:
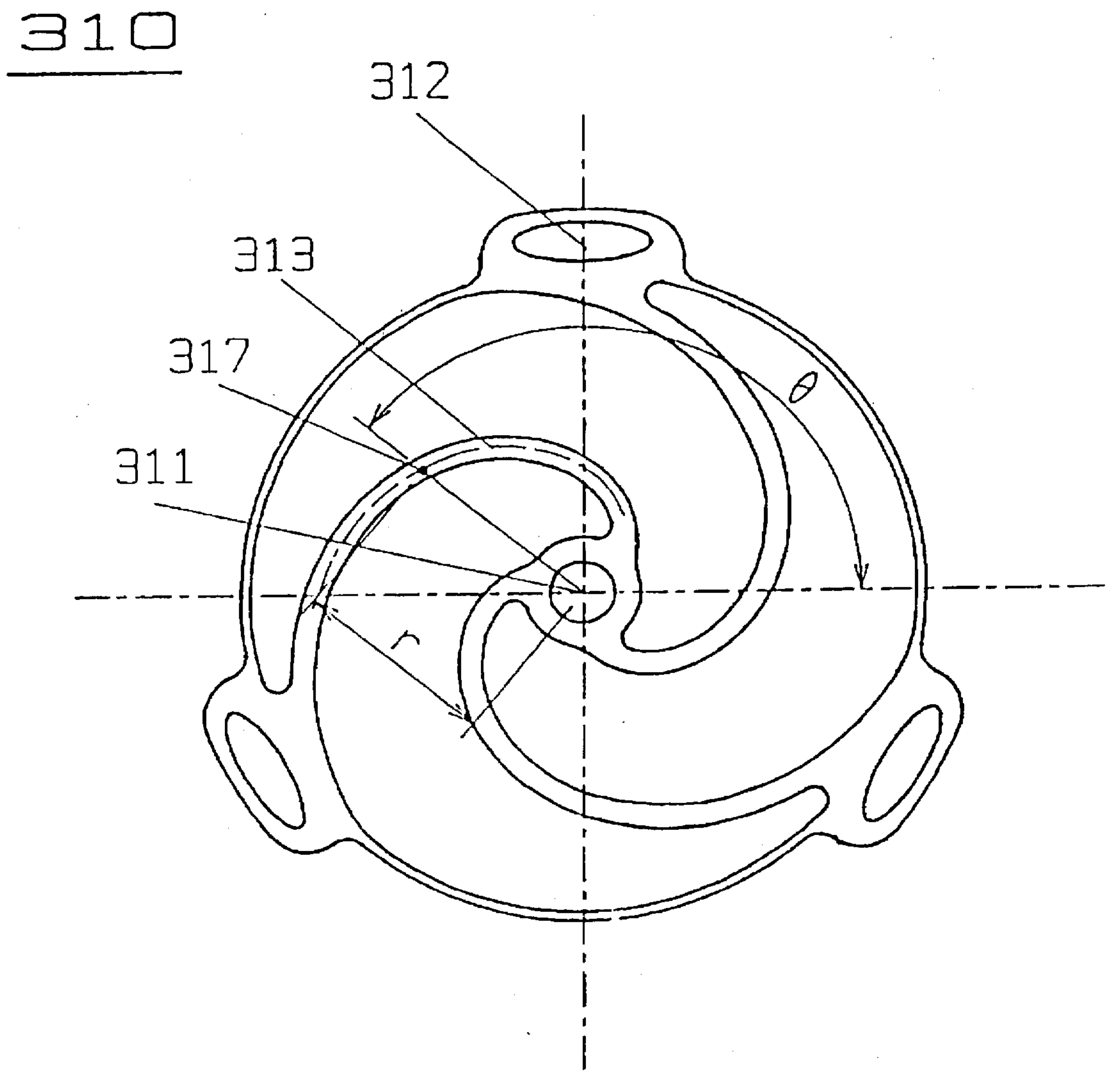
FIG. 9 is a plan view showing an embodiment of the structure of the spring used in the vibrating module of the present invention.
Figure 11:
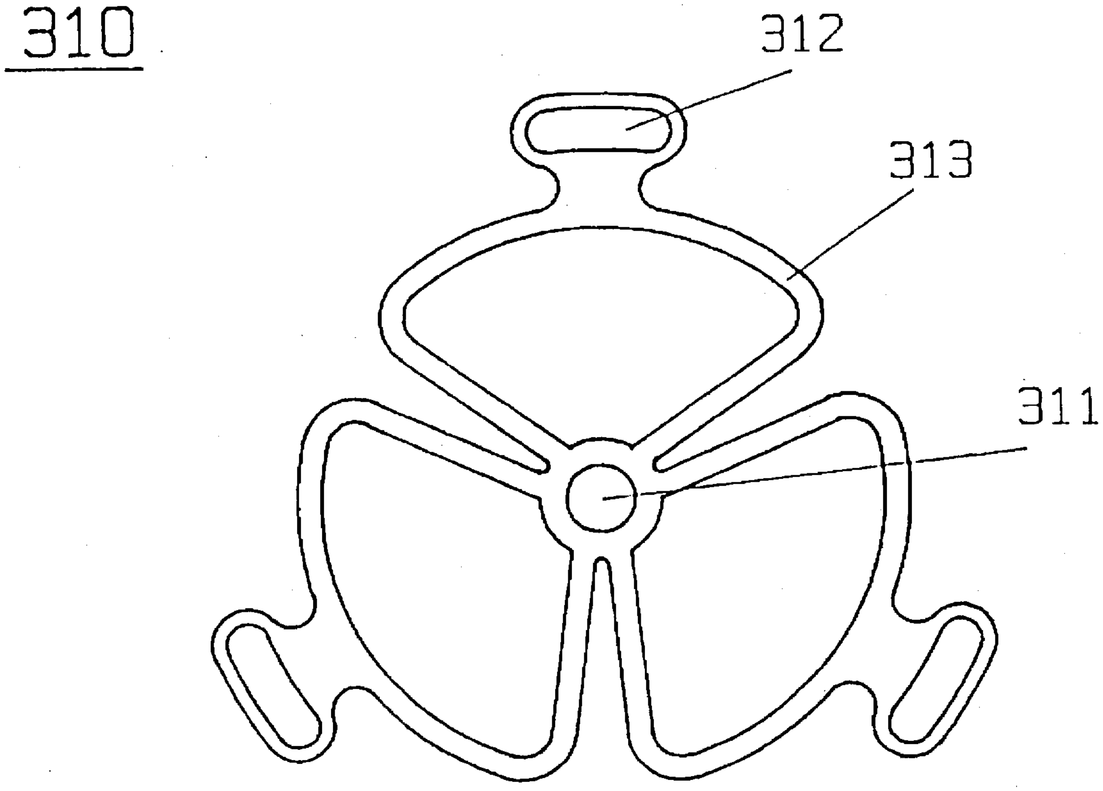
FIG. 11 is a plan view showing an embodiment of the structure of the spring used in the vibrating module of the present invention.

FIG. 8 is an example wherein the beam portion 313 of the spring has an angle with regard to the center direction. FIG. 9 is an example wherein the beam portion 313 has a curvature. FIG. 11 is an example of fan-shaped spring which has an angle with regard to the center direction and a curvature as well, having an advantage that the effective length can be extended or set as needed easily despite its simple shape.

Figure 12:
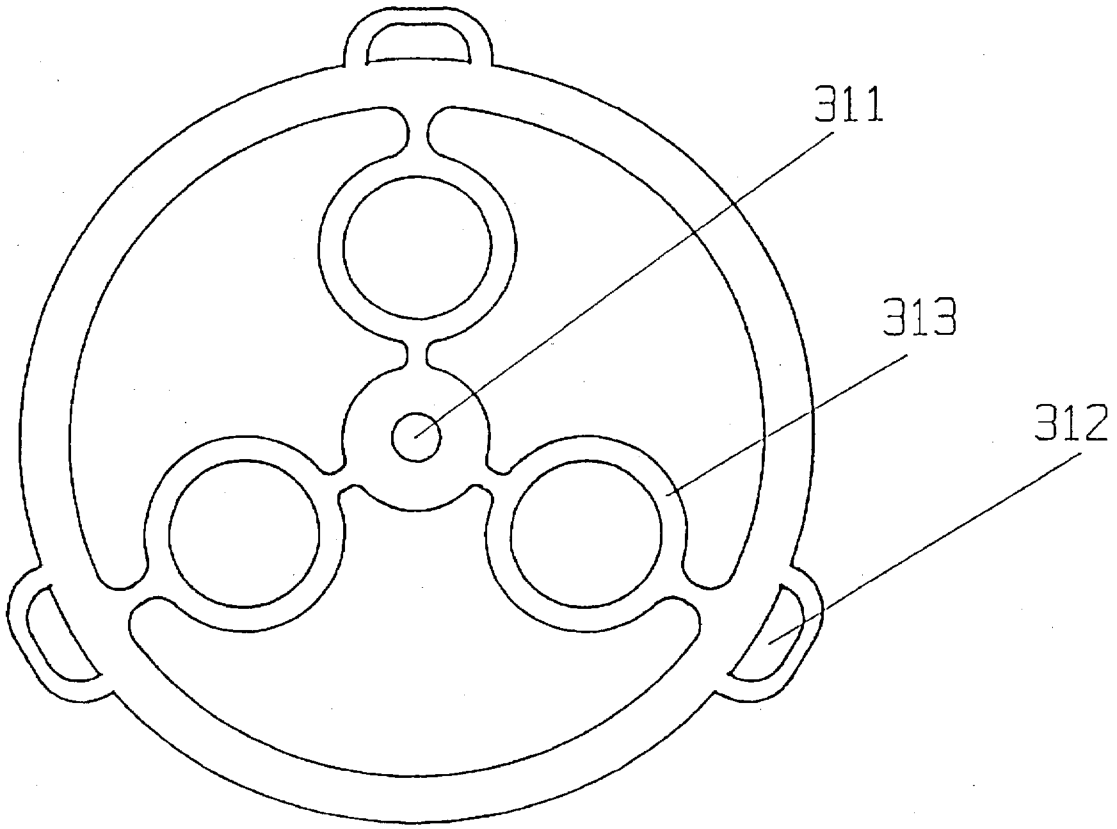
FIG. 12 is a plan view showing an embodiment of the structure of the spring used in the vibrating module of the present invention.

For a method of providing a curvature in the beam portion 313 of the spring, a round spring shown in FIG. 12 can be used. However, while a round spring has a simple shape and therefore is advantageous in the manufacturing, its effective length is difficult to be extended or set as needed with the diameter being limited in the space allowed.

Although not shown in the drawings, as a spring which has alleviated the disadvantage of the round spring of FIG. 12 above described in that the effective length is difficult to be extended or set as needed, an elliptical spring having beam portions 313 of elliptical shape instead of round shape may also be used.

The spiral spring shown in FIG. 9 has the effective length which can be extended most and set as needed with a large freedom in design, therefore from the view point of increasing the effective length of the beam portion 313 of the spring, this is the most advantageous shape for the vibrating module with a small diameter of Φ 25 mm or less of the present invention.

However, in the spiral spring, if it has a wide beam portion and a relatively small effective length, a torsional force is generated in the width direction, tending to generate abnormal vibration. To reduce the torsional force in the width direction of the beam portion of the spiral spring, the beam portion of the spring is made narrow, thick, and as long as allowed.

For the process of designing a spiral spring adjusted to the resonant frequency given by the design specification, first the length of the beam portion of the spring is determined, and then the width and after that the thickness are designed.

The center point 317 of the width of the beam portion of the spiral spring shown in FIG. 9 is represented by polar coordinates as the following formula:

[Formula 2]

$$r=\theta\times a$$

where r=distance from the center

θ=rotation angle a=pitch.

In order to reduce the torsional force in the width direction of the beam portion of the spiral spring and to attenuate the bad influence of the support of the spring, the length of the beam portion of the spring is designed to be $\theta>\pi/2$ or preferably $\theta\geqq\pi$.

Also, in the beam portion of the spring, a tensile force is effectuated in the center direction by vibration, and due to this tensile force in the center direction, a bending force is generated in the curvature and the angled portion with regard to the center direction, and a torsional moment is generated by the bending force, causing a rotary motion in the vibrating mass.

In the embodiments shown in FIG. 8 and FIG. 11, in order to prevent the above mentioned rotary motion of the vibrating mass, a pair of beams of the spring are combined which have curvatures or angles with regard to the center direction in opposite direction to each other.

Referring to FIG. 8, a method of preventing torsional moment caused by bending force will now be described whereby a spring is structured by combining a pair of beams having angles in opposite direction to each other with regard to the center direction.

The beams of the spring 313*a* and 313*b* have opposite angles to each other with regard to the center direction of the spring, with the center line 316 of the pair of the spring members being the symmetry axis. When a tensile force is effectuated in the center direction by vibration in each of the beam portions 313*a* and 313*b* of the spring, they are placed under a force in such direction as to approach the center line 316 respectively. Because the fixing hole 312 for fixing the spring to the drive coil frame is fixed at one end of the spring, while at the center hole of the spring which is the other end thereof the vibrating mass 100 is fixed ratably, the vibrating mass 100 causes torsional vibration (rotary vibration) if either the beam portion 313*a* or the beam portion 313*b* is provided alone. According to the present invention, because the beam portions 313*a* and 313*b* of the spring have opposite angles to each other with regard to the center direction of the spring, with the center line 316 of a pair of the spring members being the symmetry axis as described earlier, torsional motions have opposite direction for each beam, with the result of balancing the torsion forces, and generating no torsional vibration (rotary vibration) in the vibrating mass 100.

As specific shape of the spring member, there are a diamond shape shown in FIG. 8, a fan shape shown in FIG. 11 and an elliptic shape not shown in the drawing.

The method for reducing the torsional force in the width direction of a single spiral spring has been described earlier. In the case that two spiral springs shown in FIG. 9 are used on both sides of the vibrating mass as shown for embodiment 1, by constructing a structure wherein the directions of the spirals cross each other on both sides of vibrating mass, torsional moments in opposite directions are generated and compensate each other, causing no torque.

By the above measure, torques in the vibrating mass due to the tensile force in the center direction have opposite direction to each other and thus are compensated by each other, with the result that the vibrating mass effectuates a stable simple reciprocating motion with no rotatory force generated.

In FIG. 10 three beam portions of the spring are provided, but four pairs or more may be provided as shown in FIG. 3, and two pairs are also available. To obtain the same resonant frequency, however, compared with four or more pairs of the spring members, three pairs of the spring members have the advantage that the spring member can be made thicker or wider, therefore is easy to be manufactured and easy to be handled during assembling. Two pairs of spring members have the disadvantage that the rotary motion is generated. Therefore for the beam portion of the spring used in the present invention, three pairs of spring members are most advantageous.

In embodiment 2 shown in FIG. 4, by using only one spring, the space inside the case 410 and the case 420 can be effectively used, thereby allowing to make a thin body of the vibrating module. Moreover the assembling can be done from one side, facilitating automated assembly.

Material of spring will now be described. Assuming that the vibrating module has a frequency of 100 Hz, vibrates 10 seconds for one call, is called 10 times a day and is used for 10 years, the vibrating module vibrates $3.7\times10^{7}$ times. A material with a life enduring the fatigue of vibration repeated in this number is needed.

As is apparent from the structure of the embodiments of the present invention shown in FIG. 1, FIG. 2, FIG. 4 and FIG. 11, because the gap between the spring and the magnet is made very small to make the vibrating module thin and rare earth magnet with a large energy product is used for magnet, a very strong magnetic field acts on the spring. A spring using a magnetic material is attracted to the magnet and either the spring does not vibrate or vibration is considerably affected. Therefore the spring is preferably made of a paramagnetic material or a non-magnetic material.

To provide a largest possible excitation force, the weight of the vibrating mass is preferably made as heavy as possible. To have a resonant frequency of around 80 Hz to 150 Hz, which is determined by the above mentioned vibrating mass and the spring, Young's modules is preferably 12 $N.m^{-2}$ or more. The case is preferably made of a corrosion resistant material withstanding common environmental conditions as the case cannot be totally sealed.

Therefore the material for the spring needs to be paramagnetic or non-magnetic corrosion resistant alloy having a Young's Modules, of 12 $N.m^{-2}$ or more and a magnetization ratio of 0.5 or less practically (permeability of 1.5 or less) and preferably of $5\times10^{-3}$ or less (permeability of 1.005 or less). In the present invention, springs made of SUS 304, phosphor bronze, an age-hardening Co based alloy containing Co in an amount of 25% to 50% or Co—Ni based alloy is used.

Particularly a spring using an age-hardening Co based alloy containing Co in Co—Ni based amount of 25% to 50% or an alloy of Co—Ni radical has a Young's Modules of 22 $N.m^{-2}$ or more, a tensile strength of 130 $kgf/mm^2$ or more, a fatigue limit of 75 $kgf/mm^2$ or more, and corrosion loss of 1 $mg/cm^2$ or less per hour when immersed in a chemical of halogen acid and salt, mixed hydrofloutic-nitric acid of 60° C.

Therefore they are materials satisfying all the properties required for the spring of the present invention, namely high elasticity, tensile strength, fatigue strength against repeated stress, magnetic attraction to the magnet, and corrosion resistance.

The composition of the age-hardening Co based alloy containing Co in an amount of 25% to 50% used in the present invention is an alloy of Co radical consisting of 25–50 wt. % of Co, 10–20 wt. % of Ni, 10–30 wt. % of Cr, 2–10 wt. % of Mo, 1–5 wt. % of W, 0.01–3 wt. % of one or more selected among Ti, Al, Mn, Si, Be and Nb, and 10 to 30 wt. % of Fe, subjected to cold working by a reduction of 60% or more, and then subjected to aging treatment at 300° to 700° C.

The Co—Ni based alloy used in the present invention contains Co, Ni, Cr and Mo as main component, consisting of 20–40 wt. % of Cr+Mo, 20–50 wt. % of Ni, 25–45 wt. % of Co, 0.1–3 wt. % of each of Mn, Ti, Al and Fe, 0.1–3 wt. % of Nb, 0.01–1 wt. % of one or more rare-earth elements selected among Ce, Y and misch metal, subjected to cold working by a reduction of 60% to 90%, and then subjected to aging treatment at 500° to 600° C.

The drive coil block 200 has a structure wherein a drive coil 220 is wound around a bobbin 210 made of resin as described earlier. In FIG. 4 the bobbin 210 is integrally formed with the terminal 510. The terminal 510 is electrically connected to the drive coil 220. By a drive current from the outside, magnetic flux is generated in the drive coil 220.

A terminal is used as current supply path to the drive coil in FIG. 4, but other means such as lead wire and flexible substrate may also be used.

A spring 310 is joined with the drive coil block 200. For the method of joining, a protruding part 211 is provided on the bobbin 210 corresponding to the fixing hole 312 of the spring 310, and the protruding part 211 is put through the fixing hole 312 and heat welded or ultrasonic welded to join the spring 310 with the bobbin 210.

For the method of joining, other than the method above mentioned, a method whereby the bobbin 210, the spring 310 and the terminal 510 are integrally formed and other methods such as using adhesive or mechanical method may also be used.

Because the vibrating module of the present invention is subjected to heat of 260° C. during soldering, or reflow soldering for surface mounting, of the terminal, the material of bobbin must be heat resisting resin with a softening point of 260° C. or more.

Figure 13:
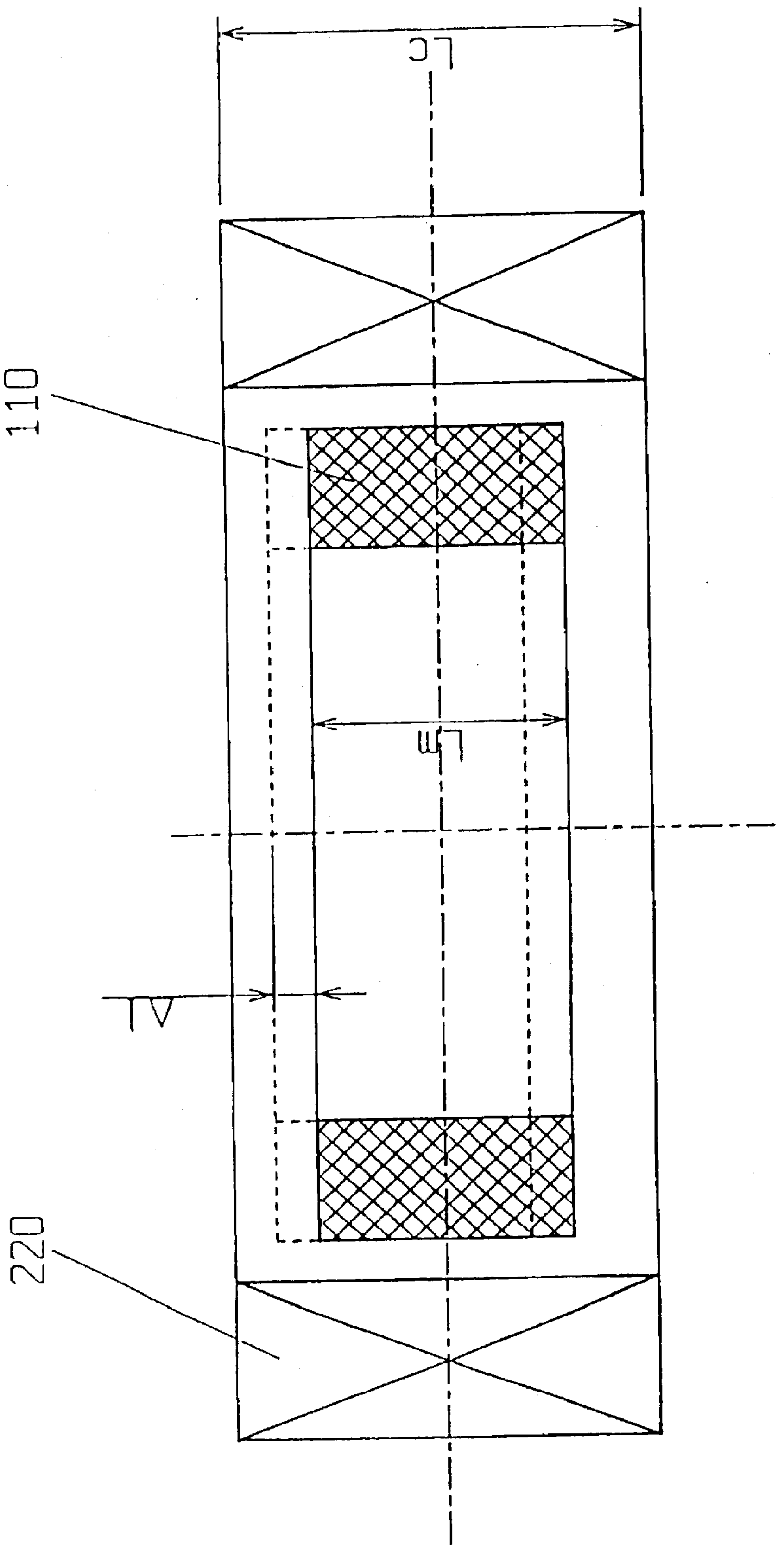
FIG. 13 is a schematic diagram explaining the positional relationship between the drive coil and the magnet used in the vibrating module of the present invention.

The relationship between the drive coil and the magnet will now be described. FIG. 13 is a schematic diagram explaining the positional relationship between the drive coil and the magnet used for the vibrating module of the present invention. As has been described in detail for embodiment 1 shown in FIG. 1 and FIG. 2 and for embodiment 2 shown in FIG. 4, the magnet 110 is located around the inner circumference of the drive coil 220 and vibrates in the direction of the axis.

In the embodiment shown in FIG. 13, while a drive current is not passed through the drive coil, the center of the height of the drive coil substantially coincides with the center of the height of the magnet, and the height of the drive coil Lc is larger than the height of the magnet Lm.

Figure 14:
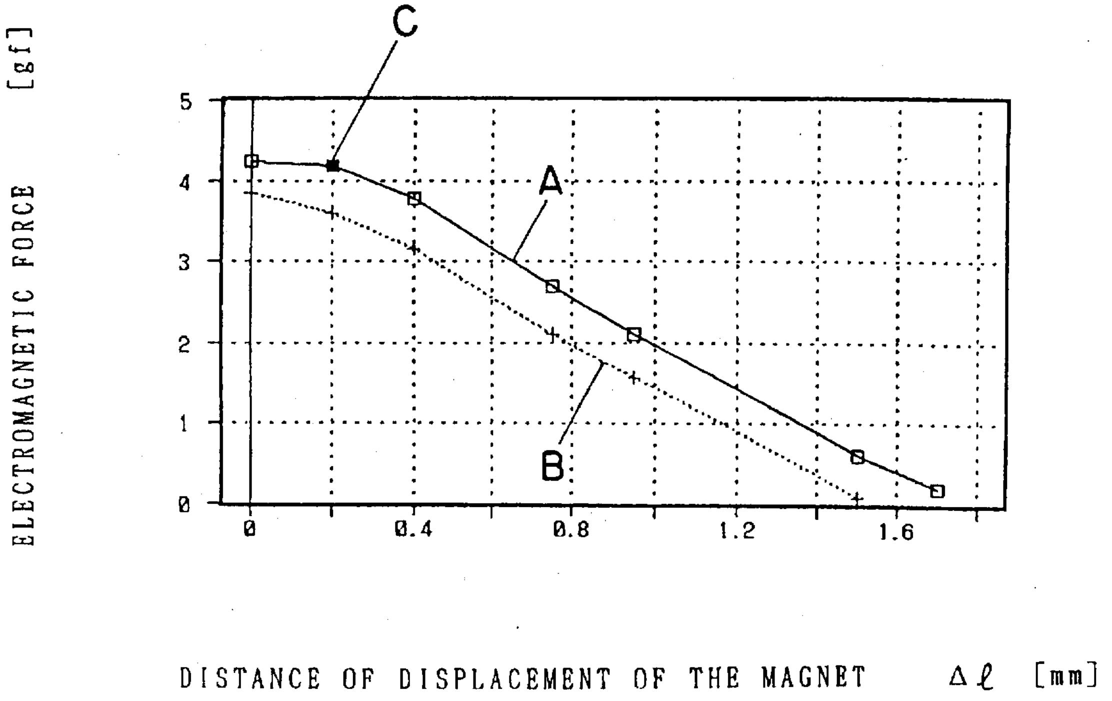
FIG. 14 is a graph showing the relationship between the displacement of the magnet used in the vibrating module of the present invention and the electromagnetic force generated.

FIG. 14 is a graph showing a relationship between the displacement of the magnet used in the vibrating module of the present invention and generated electromagnetic force. Referring to FIG. 14, curve A and curve B indicate the relationship between the displacement of the magnet and the resulting electromagnetic force in an example having a height of the drive coil Lc larger than the height of the magnet Lm(curve A) and in an example having a height of the drive coil Lc equal to the height of the magnet Lm(curve B) respectively.

Δ1 of the horizontal axis indicates the distance of displacement from the static position of the magnet. The vertical axis is the electromagnetic force exerted on the magnet when a regular drive current is supplied to the drive coil at each displacement of the magnet.

As is apparent from the result shown in FIG. 14, in the case indicated by curve A wherein the height of the drive coil Lc is larger than the height of the magnet Lm, the electromagnetic force exerted on the magnet does not decrease substantially until point C where the end face of the drive magnet confronts the end face of the coil. Even when the end face of the magnet protrudes from the end face of the drive coil, the electromagnetic force exerted on the magnet indicated by curve A for the case of Lc>Lm is always larger than the electromagnetic force exerted on the magnet indicated by curve B for the case of equal height of the drive coil and the magnet.

Therefore the graph indicates that in the case of curve A, with the height of the drive coil being larger than the height of the magnet, a drive force to the vibrating mass generated by the electromagnetic force exerted on the magnet when a given drive current is supplied is larger than a drive for in the case of curve B and in the case of curve A, the vibration output of the vibrating module is more efficiently provided.

In embodiment 1 to embodiment 3 which will be described later, the magnet is a movable part. In the case where the drive coil is a movable part, a large driving force is generated by providing the drive coil in such condition that the center of the height thereof substantially coincides with the center of the height of the coil of the magnet when no drive current is supplied to the drive coil, and that the height of the magnet Lm is larger than the height of the drive coil Lc.

In this case, in the same way as embodiment 1, the vibrating module with a linear vibrating motion which is the purpose of the present invention can be constructed by the above described drive coil block 200 with terminal 510, vibrating mass 100, and spring 310 only, with the gap between the magnet 110 and the drive coil 220 narrowed as much as possible to improve in the electromagnetic efficiency. Consequently vibration is restricted or stopped if unexpected particles such as dust intrude or the spring 310 comes into contact with an external object. To prevent this, the cases 410 and 420 are provided.

The cases 410 and 420 must be made of non-magnetic material in the same way as embodiment 1.

[Embodiment 3]

Another embodiment of the present invention will be hereinafter described referring to the drawing.

Figure 15:
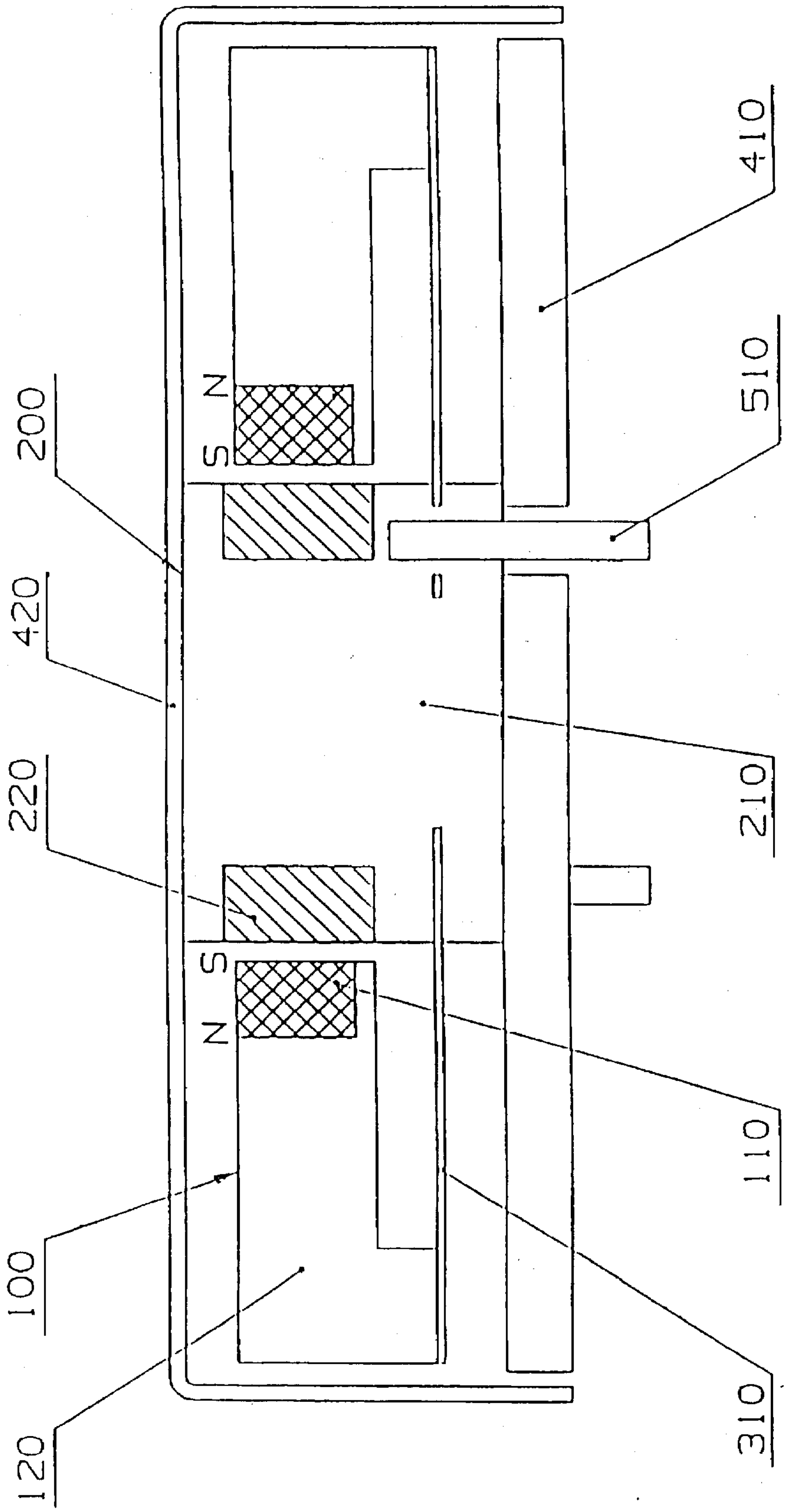
FIG. 15 is a section view showing the structure of a vibrating module of an embodiment of the present invention.
Figure 16:
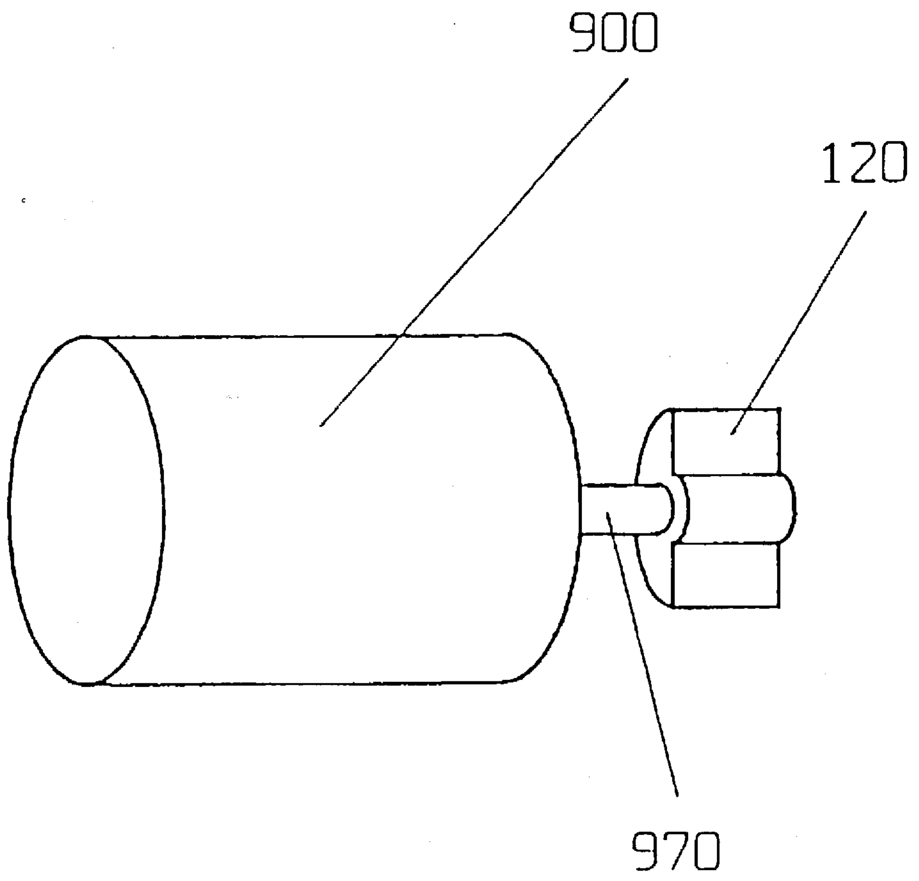
FIG. 16 is an outerward appearance view of a conventional vibrating module using a cylindrical motor.
Figure 17B:
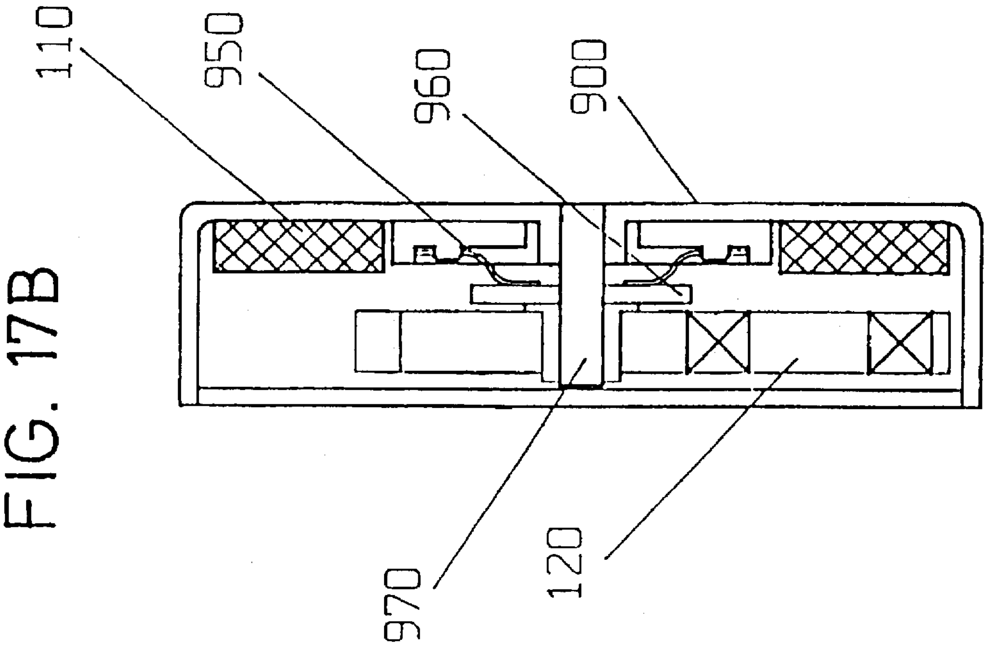
FIGS. 17A and 17B are a longitudinal section view of a conventional vibrating module using a flat motor and a top plan view of the rotor thereof.
Figure 17A:
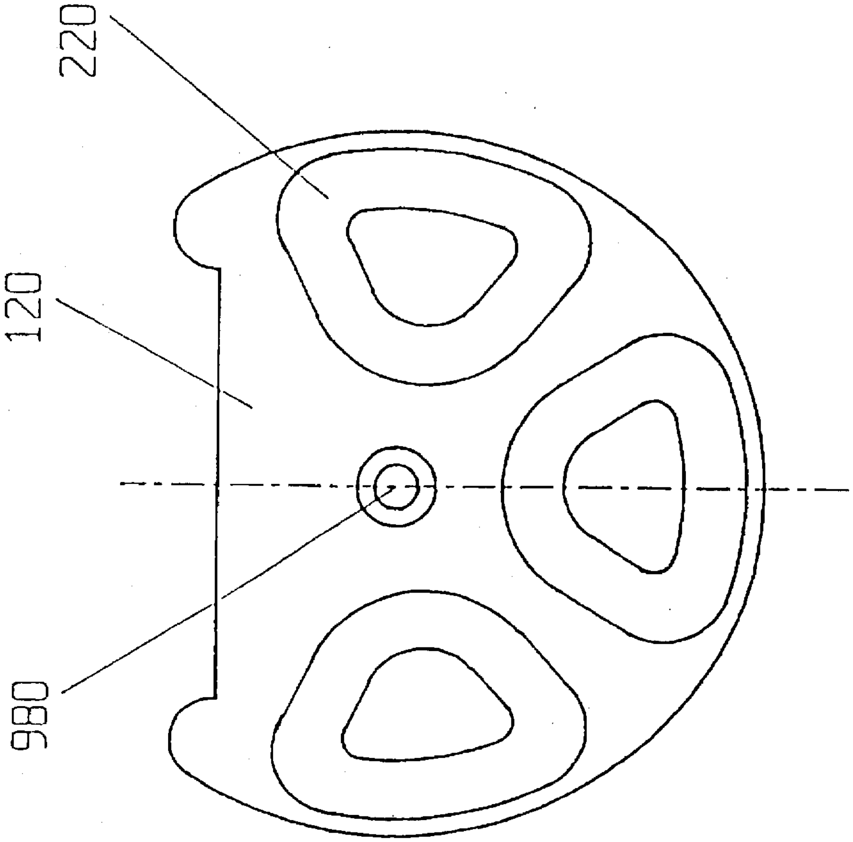

Referring to FIG. 15, a spring 310 is joined with a vibrating mass 100 by means such as welding, and is fixedly secured to a drive coil block 200 by means such as insert forming. The drive coil block 200 comprises drive coil 220 wound around a drive coil frame 210 made of resin.

A magnet 110 which is a constituent of the vibrating mass 100 is located around the outer circumference of the drive coil 220, confronting the drive coil in the radial direction with a minute gap between them. An electromagnetic force is produced by a current supplied to the drive coil 220 and the magnet 110, vibrating the vibrating module in the longitudinal direction. The cases 410 and 420 contain the drive coil block 200 joined with the spring 310 and the vibrating mass 100.

For the vibrating mass 100, a single ring-shaped magnet 110 is so formed in a magnetic field as to be oriented in the radial direction as described in detail for embodiment 1 and embodiment 2, and is so magnetized as to have a single pair of magnetic poles in the radial direction, and this magnet 110 and a weight 120 are fastened together by adhesive or the like to constitute a vibrating mass.

As the resonance frequency of the vibrating module is determined by the spring 310 and the weight of the vibrating mass 100, the weight 120 supporting the magnet 110 has a purpose of adjusting the weight of the vibrating mass. The vibrating mass is made of metal material with a large specific gravity such as tungsten alloy or lead alloy in the same way as embodiment 1 and embodiment 2 to provide the needed weight with a small volume so that a small and thin-body vibrating module is obtained.

The resonant frequency of the vibrating module of the present invention is adjusted to approximately. 80 Hz to 150 Hz by means of the spring 310 and the vibrating mass 100.

The shape of the weight has a protruding contact portion with the spring 310 to allow optimum setting of the effective length of the spring. The distance between the spring 310 and the vibrating mass 100 must be larger than the designed amplitude of vibration of the vibrating module.

The vibrating mass 100 and the spring 310 are joined together by laser welding from the surface of the spring 310. While the main component of the weight used for the vibrating mass 100 is tungsten having a relatively high electrical resistance in comparison with other metals and therefore is difficult to be welded by usual resistance welding, the joining method of laser welding whereby to melt and fuse the metal to be joined by heat of laser can easily weld together the weight 120 made mainly of tungsten and the spring 310.

For the joining method of the weight and the spring, other than the above mentioned laser welding, other welding methods such as resistance Welding is possible provided that the welding electrode is made of appropriate material such as silver tungsten. Caulking, adhesives, caulking pin driving may also be used for joining the weight and the spring.

The resonant frequency determined by the spring and the vibrating mass can be designed using a model of beams also in embodiment 3. If the vibrating mass is light in weight, the spring becomes relatively thin, causing problem in strength. The shape of the spring must be determined considering fatigue life.

Therefore as described in detail for embodiment 2, material of the spring needs to be a paramagnetic or non-magnetic corrosion resistant alloy having a Young's modules of 12 $N.m^{-2}$ or more and a magnetization ratio of 0.5 or less practically (permeability of 1.5 or less) and preferably of $5\times10^{-3}$ or less (permeability of 1.005 or less). In the present invention, a spring made of SUS 304, phosphor bronze, an age-hardening Co based alloy containing Co in an amount of 25% to 50% or Co—Ni based alloy is used.

Particularly a spring using an age-hardening Co based alloy containing Co in an amount of 25% to 50% or Co—Ni based alloy is most suitable for the vibrating module of the present invention, as described earlier.

The coil block 200 consists of the drive coil 220 directly wound around the drive coil frame 210 made of resin, as described earlier. The drive coil frame has the terminal 510 integrated therewith by insert forming for supplying drive current to the drive coil from the outside. The terminal 510 and the drive coil 220 are electrically connected to each other, and by a drive current from the outside, a magnetic field is generated in the drive coil. For the current supply path to the drive coil, other means such as lead wire and flexible substrate may also be used.

The spring 310 is joined to the drive coil block 200. For the joining method, insert forming is used whereby the drive coil frame 210 made of resin is formed while the spring 310 is inserted therein to be integral therewith. In another method, a protruding portion is provided on the drive coil frame and is part through the fixing hole of the spring, and then the protruding portion is heat welded or ultrasonic welded to join the spring to the drive coil frame. Other methods such as using adhesive or mechanical mating may also be used In terms of the relationship between the magnet 110 and the drive coil 220, as described in detail for embodiment 1 and embodiment 2, while the magnet 110 is located around the outer circumference of the driving coil in the present embodiment, by locating them in such a way that the center of the height of the drive coil substantially coincides with the center of the height of the magnet and that the height of the drive coil Lc is larger than the height of the magnet Lm, the driving force by the magnet 110 and the drive coil 220 can be effectively utilized, as shown in FIG. 14.

In the same manner as embodiment 1 and embodiment 2, a vibrating module vibrating in a linear reciprocation motion of the purpose of the present invention can be constructed by the above described drive coil block 200 with built-in terminal 510, the vibrating mass 100 and the spring 310, with the gap between the magnet 110 and the drive coil 220 narrowed as much as possible to improve electromagnetic efficiency. Consequently vibration is restricted or stopped if unexpected particles such as dust intrude or the spring 310 comes into contact with an external object. To prevent this, the cases 410 and 420 are provided.

The cases 410 and 420 must be made of non-magnetic material in the same way as embodiment 1 and embodiment 2.

Mechanical uniting such as caulking and crimping is advantageous for fixing a metal case, but adhering is also available. In another method, a protruding portion is provided on the drive coil block 200 which protrudes out of the case, and the protruding portion and the case are heat welded or ultrasonic welded. For a plastic case, mechanical mating such as heat welding or ultrasonic welding as well as the use of adhesive are also available.

Although not shown in the drawings, the case 420 may be a substrate on which a driving circuit for driving the vibrating module is mounted. A catch member for fixing the driving circuit to the drive coil frame may be provided in the case 410 to secure the driving circuit substrate by the catch member.

[Effect of the invention]

In the present invention as described above, (1) A vibrating mass comprising a radial anisotropic ring-shaped permanent magnet magnetized to constitute a single pair of magnetic poles in the radial direction is put in a reciprocating motion to generate vibration. Thereby as the magnet confronts the drive coil around the circumference, the generation efficiency of electromagnetic force is significantly increased. Moreover small number of parts used because of use of a single magnet reduces the cost of parts as well as the manufacturing cost.

Furthermore, in comparison with the vibrating modules using a plurality of magnets which are difficult to assemble because the magnets generate repulsion and attraction force between them when coming close to each other, and wherein the dispersion of each magnet and the dispersion of dimensions produced during assembly are multiplied, force acting on the magnets by electromagnetic force with drive coil becomes ununiform, as a result, causing the magnet and the drive coil to come into contact to each other, these problems are solved in the present invention.

(2) The drive coil and the magnet are so arranged that the center of the height of the drive coil and the center of the height of the magnet substantially coincide with each other and the height of the drive coil Lc>the height of the magnet Lm in the case of the movable magnet, or Lc<Lm in the case of the movable coil. While in the conventional vibrating modules the drive force of the drive coil is reduced when the magnet is displaced and, as a result, the end surface of the magnet protrudes from the end surface of the drive coil, in the present invention, by adopting the structure above mentioned, reduction in drive force is improved, the efficiency of the magnetic circuit of the vibrating module is increased, a low power consumption is achieved, and a sufficient vibration output owing to the increased drive force is provided.

(3) For the shape of the vibrating mass, either the surface of the vibrating mass confronting a spring has a deflection curve described as:

[Formula 1]

$$Y=k\times\{3\times X/L-4\times(X/L)^3\}$$

where $0\leqq X\leqq(L/2)$ $$Y=k\times[3\times(L-X)/L-4\times\{(L-X)/L\}^3]$$

where $(L/2)<X\leqq L$ or the surface of the vibrating mass is so formed as not to contact the deflection curve of the spring given by Formula 1 except the joint part of the vibrating mass and the spring when the spring reaches it's largest designed amplitude. This allows to maximize the weight of the vibrating mass while the vibrating mass and the spring are being prevented from contacting each other during operation of the vibrating module, thus improving the excitation force of the vibrating module and providing a sufficient vibration output while achieving a thinner body.

(4) The springs with opposite torsion polarities are arranged over and under the vibrating mass confronting each other or the spring members with opposite torsion polarities are combined and integrated into a spring and arranged in the vibrating module so that the torsional motions are compensated by each other. Thus the vibrating mass effectuates a stable reciprocating motion only without generating a torsional motion.

(5) In the case that two springs are used, the springs has a three-dimensional shape so that the distance from the upper to the lower springs varies in the radial direction at the center and the circumference of the spring, being smaller at the center part, thus allowing the gap between the spring and the case to approach zero, and achieving a thinner body of the vibrating module.

What is claimed is:

1. A vibrating module for generating a mainly non-audible alert signal, comprising: a vibrating mass supported by a spring and having a weight and a permanent magnet comprised of a single ring magnet magnetized to have a single pair of magnetic poles in the radial direction; a drive coil for placing the vibrating mass in a continuous reciprocating motion close to a resonant frequency determined by the vibrating mass and the spring; means for supplying an electrical signal to the drive coil; and means for transmitting the vibration of the vibrating mass via the spring.

2. A vibrating module according to claim 1; wherein the permanent magnet is oriented to be radially anisotropic.

3. A vibrating module according to claim 1 or claim 2; wherein the drive coil is arranged around the outer or inner circumference of the single ring magnet to define a slight gap therebetween, the drive coil and the single ring magnet confronting each other around the circumference in the radial direction thereof.

4. A vibrating module according to claim 1 or claim 2; wherein the permanent magnet is a rare earth magnet.

5. A vibrating module for generating a mainly non-audible alert signal, comprising: a vibrating mass supported by a spring and having a magnet; a drive coil for placing the vibrating mass in a continuous reciprocating motion close to a resonant frequency determined by the vibrating mass and the spring; a coil frame supporting the drive coil; means for supplying an electrical signal to the drive coil; and means for transmitting the vibration of the vibrating mass via the spring; wherein one of the magnet and the drive coil is movable, and the drive coil and the magnet are so arranged that the center of the height of the drive coil and the center of the height of the magnet substantially coincide with each other and the height Lc of the drive coil is greater than the height Lm of the magnet when the magnet is movable and Lc<Lm when the drive coil is movable.

6. A vibrating module for producing a mainly non-audible alert signal, comprising: a vibrating mass supported by a spring; a drive coil for placing the vibrating mass in a continuous reciprocating motion close to a resonant frequency determined by the vibrating mass and the spring; a coil frame supporting the drive coil; means for supplying an electrical signal to the drive coil; and means for transmitting the vibration of the vibrating mass via the spring; wherein either a section of the vibrating mass confronting the spring has a deflection curve represented by the following Formula 1:

$$Y=k\times\{3\times X/L-4\times(X/L)^3\}$$

where $0\leqq X\leqq(L/2)$ $$[Y=k\times[3\times(L-X)/L-4\times\{(L-X)/L\}]^3]]$$

$$Y=k\times[3\times(L-X)/L-4\times\{(L-X)/L\}^3]$$

where $(L/2)<X\leqq L$, where

L=length of the spring k=constant determined by the material and shape of the spring X,Y=coordinates of a point defined on the deflection curve, or the shape of the vibrating mass is so formed as not to contact the deflection curve of the spring given by Formula 1 except the joint part of the vibrating mass and the spring when the vibration amplitude of the vibrating mass reaches the largest designed amplitude.

7. A vibrating module for generating a mainly non-audible alert signal, comprising: a vibrating mass supported by a plurality of springs; a drive coil for placing the vibrating mass in a continuous reciprocating motion close to a resonant frequency determined by the vibrating mass and the springs; a coil frame supporting the drive coil; means for supplying an electrical signal to the drive coil; and means for transmitting the vibration of the vibrating mass via the springs; wherein the springs have opposite torsion polarities and are arranged over and under the vibrating mass in opposing relation to each other to balance the torsional forces generated by the springs.

8. A vibrating module according to claim 7; wherein the vibrating mass comprises at least a weight and a permanent magnet having a ring shape.

9. A vibrating module according to claim 8; wherein the permanent magnet is a single ring magnet magnetized in the radial direction to have a single pair of magnetic poles.

10. A vibrating module according to claim 9; wherein the permanent magnet is oriented to be radially anisotropic.

11. A vibrating module as in any of claims 1–2 or 5–10; wherein the vibrating mass is arranged around the outer circumference of the drive coil.

12. A vibrating module as in any of claims 1–2 or 5–10; wherein the vibrating mass is arranged around the inner circumference of the drive coil.

13. A vibrating module as in any of claims 1–2 or 5–10; further comprising a bobbin around which the drive coil is wound, and a planar spring connected to the bobbin.

14. A vibrating module according to claim 7; wherein two of the springs are arranged three-dimensionally so as to have different heights at a mounting portion thereof and at a center portion thereof fixed to the vibrating mass.

15. A vibrating module as in any of claims 1–2 or 5–10; wherein the specific weight of the vibrating mass is 10 or higher.

16. A vibrating module as in any of claims 1–2 or 5–10; wherein the spring comprises a plurality of beam portions, a supporting portion connected to the beam portions, and a holding portion for fixing the spring to the vibrating mass.

17. A vibrating module according to claim 16; wherein the spring is a spiral spring; and wherein each of the beam portions has a locus of a center point of the width thereof represented by polar coordinates according to the formula: [Formula 2]

$$r=\Theta\times a$$

where r=distance from the center

Θ=rotation angle a=pitch, and r is maximized when $\Theta>\pi/2$.

18. A vibrating module as in any of claims 1–2 or 5–10; wherein the spring is comprised of a non-magnetic or paramagnetic corrosion resistant alloy having a Young's Modulus of 12 $N.m^{-2}$ or more, a magnetization ratio of 0.5 or less and a permeability of 1.5 or less.

19. A vibrating module according to claim 18; wherein the alloy is an age-hardening Co based alloy containing Co in an amount of 25% to 50% or a Co—Ni based alloy.

20. A vibrating module according to claim 19; wherein the alloy is a Co based alloy comprising 25–50 wt. % of Co, 10–20 wt. % of Ni, 10–30 wt. % of Cr, 2–10 wt. % of Mo, 1–5 wt. % of W, 0.01–3 wt. % of one or more metals selected from the group consisting of Ti, Al, Mn, Si, Be and Nb, and 10 to 30 wt. % of Fe, the alloy being subjected to cold working by a reduction of 60% or more and to aging treatment at 300° to 700° C.

21. A vibrating module according to claim 19; wherein the alloy is a Co—Ni based alloy having Co, Ni, Cr and Mo as the main components and comprised of 20–40 wt. % of Cr+Mo, 20–50 wt. % of Ni, 25–45 wt. % of Co, 0.1–3 wt % of each of Mn, Ti, Al and Fe, 0.1–3 wt. % of Nb, and 0.01–1 wt. % of one or more rare earth elements selected from Ce, Y and misch metal, the Co—Ni based alloy being subjected to cold working by a reduction of 60% to 90% and to aging treatment at 500° to 600° C.

22. A vibrating module as in any of claims 1–2, 5–10 or 19–21; wherein the drive coil is an air-core coil.

23. A vibrating module as in any of claims 5–10 or 19–21; wherein the coil frame is comprised of heat resistant resin having a softening point of 260° C. or higher.

24. A vibrating module as in any of claims 5–10 or 19–21; wherein the means for supplying an electrical signal is a terminal formed integrally with the coil frame.

25. A vibrating module as in any of claims 1–2, 5–10 or 19–21; wherein the vibrating module is contained in a non-magnetic case.

26. A vibrating module as in any of claims 5–10 or 19–21; further comprising a housing for containing the vibrating module and a cover attached to the housing, the housing having a catch member for fixing a drive circuit substrate to the coil frame.

* * * * *